(12) United States Patent
Namgoong et al.

(10) Patent No.: US 11,804,998 B2
(45) Date of Patent: Oct. 31, 2023

(54) MACHINE LEARNING BASED RECEIVER PERFORMANCE IMPROVEMENT USING PEAK REDUCTION TONES

(71) Applicant: QUALCOMM Incorporated, San Diego, CA (US)

(72) Inventors: June Namgoong, San Diego, CA (US); Krishna Kiran Mukkavilli, San Diego, CA (US); Taesang Yoo, San Diego, CA (US); Naga Bhushan, San Diego, CA (US); Tingfang Ji, San Diego, CA (US); Pavan Kumar Vitthaladevuni, San Diego, CA (US); Jay Kumar Sundararajan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 269 days.

(21) Appl. No.: 17/154,215

(22) Filed: Jan. 21, 2021

(65) Prior Publication Data
US 2021/0266036 A1   Aug. 26, 2021

Related U.S. Application Data

(60) Provisional application No. 63/009,369, filed on Apr. 13, 2020, provisional application No. 62/980,776, filed on Feb. 24, 2020.

(51) Int. Cl.
*H04L 27/26* (2006.01)
*H04B 3/23* (2006.01)
(Continued)

(52) U.S. Cl.
CPC ...... *H04L 27/2618* (2013.01); *G06F 18/2148* (2023.01); *G06N 3/045* (2023.01);
(Continued)

(58) Field of Classification Search
CPC .. H04B 3/238; H04B 3/06; H04B 3/46; G06F 18/2148; G06N 3/045; G06N 3/08;
(Continued)

(56) References Cited

U.S. PATENT DOCUMENTS 10,084,632 B2   9/2018   Agon
10,153,933 B2   12/2018   Yang et al.
(Continued)

FOREIGN PATENT DOCUMENTS

CA   2763134 A1 * 12/2010
CA   2910352 A1 * 10/2014
(Continued)

OTHER PUBLICATIONS

International Search Report and Written Opinion—PCT/US2021/014503—ISA/EPO—dated Apr. 26, 2021 17 pages.
(Continued)

*Primary Examiner* — Akelaw Teshale
(74) *Attorney, Agent, or Firm* — The Marbury Law Group

(57) ABSTRACT

Various embodiments include methods performed in receiver circuitry of a wireless communication device for demodulating wireless transmission waveforms to reconstruct data tones, which may include receiving, from a transmitter, wireless transmission waveforms that includes peak reduction tones (PRTs) that were inserted by a PRT neural network in the transmitter, and demodulating the received wireless transmission waveforms using a decoder neural network that has been trained based on outputs of the transmitter to output a reconstruction of the data tones. Further embodiments include exchanging information between the transmitter and receiver circuitry to coordinate the PRT neural network used for inserting PRTs in the transmitting wireless communication device and the decoder
(Continued)

neural network used in the receiving wireless communication device for demodulating transmission waveforms received from the transmitting wireless communication device.

28 Claims, 15 Drawing Sheets

(51) Int. Cl.
| | |
|---|---|
| *H04B 3/06* | (2006.01) |
| *G06N 3/08* | (2023.01) |
| *H04B 3/46* | (2015.01) |
| *G06N 3/088* | (2023.01) |
| *H04L 5/00* | (2006.01) |
| *H04W 72/04* | (2023.01) |
| *G06F 18/214* | (2023.01) |
| *G06N 3/045* | (2023.01) |

(52) U.S. Cl.
CPC ............... *G06N 3/08* (2013.01); *G06N 3/088* (2013.01); *H04B 3/06* (2013.01); *H04B 3/238* (2013.01); *H04B 3/46* (2013.01); *H04L 5/0048* (2013.01); *H04L 27/2615* (2013.01); *H04W 72/04* (2013.01)

(58) Field of Classification Search
CPC ........ G06N 3/088; G06N 3/044; G06N 3/084; H04L 5/0048; H04L 27/2615; H04L 27/2618; H04L 5/0053; H04W 72/04
See application file for complete search history.

(56) References Cited

U.S. PATENT DOCUMENTS

| | | | |
|---|---|---|---|
| 10,177,951 B2 | 1/2019 | Oh et al. | |
| 10,305,553 B2 | 5/2019 | O'Shea et al. | |
| 10,531,415 B2 | 1/2020 | O'Shea et al. | |
| 2003/0040876 A1* | 2/2003 | Rao ....................... G06F 17/141 | 702/76 |
| 2009/0141823 A1 | 6/2009 | Long | |
| 2010/0008442 A1 | 1/2010 | Hellberg | |
| 2010/0172438 A1 | 7/2010 | Koyanagi et al. | |
| 2012/0116756 A1* | 5/2012 | Kalinli ................ G10L 15/1807 | 704/207 |
| 2013/0177089 A1* | 7/2013 | Al-Safadi ........... H04L 27/2624 | 375/260 |
| 2015/0146805 A1* | 5/2015 | Terry ...................... H04L 5/001 | 375/349 |
| 2015/0146806 A1* | 5/2015 | Terry .................. H04L 27/2626 | 375/260 |
| 2015/0268686 A1* | 9/2015 | Wu ........................ G05B 15/02 | 700/291 |
| 2016/0365997 A1 | 12/2016 | Park et al. | |
| 2019/0044792 A1 | 2/2019 | Kwon et al. | |
| 2019/0274108 A1* | 9/2019 | O'Shea ............. H04W 72/0453 | |
| 2019/0285742 A1 | 9/2019 | Wang et al. | |
| 2020/0412589 A1 | 12/2020 | Park et al. | |
| 2021/0266210 A1 | 8/2021 | Namgoong et al. | |
| 2022/0159678 A1* | 5/2022 | Back ..................... H04W 72/20 | |
| 2022/0263695 A1 | 8/2022 | Oh et al. | |

FOREIGN PATENT DOCUMENTS

| | | | |
|---|---|---|---|
| CN | 101192405 B | * | 5/2011 |
| RU | 2161826 C2 | * | 1/2001 |

OTHER PUBLICATIONS

Li L., et al., "Improved Tone Reservation Method Based on Deep Learning for PAPR Reduction in OFDM System", 2019, 11th International Conference on Wireless Communications and Signal Processing (WCSP), IEEE, Oct. 23, 2019 (Oct. 23, 2019),6 pages, XP033671896, DOI: 10.1109/WCSP.2019.8928103 [retrieved on Dec. 6, 2019] Sections II. and III. figure 1, p. 1, right-hand col. p. 2, right-hand col.—p. 3,left-hand col. paragraph [IIIC].

Mizutani K., et al., "A PAPR Reduction of OFDM Signal Using Neural Networks with Tone Injection Scheme", 2007 6th International Conference On Information, Communications & Signal Processing; Singapore; Dec. 10-13, 2007, IEEE, Piscataway, NJ, USA, Dec. 10, 2007 (Dec. 10, 2007), 5 pages, XP031229663, ISBN: 978-1-4244-0982-2, The whole document.

Ohta M., et al., "Complexity Suppression of Neural Networks for PAPA Reduction of OFDM Signal", IEICE Transactions on Fundamentals of Electronics, Communications and Computer Sciences, Engineering Sciences Society, Tokyo, JP, vol. E93A, No. 9, Sep. 1, 2010 (Sep. 1, 2010), pp. 1704-1708, XP001558593, ISSN: 0916-8508, DOI: 10.1587/TRANSFUN.E93.A.1704, paragraph [0003].

Ohta M., et al., "PAPR Reduction of OFDM Signal by Neural Networks without Side Information and its FPGA Implementation", Electronics and Communications in Japan, Scripta Technica, New York, US, vol. 91, No. 4, Apr. 1, 2008 (Apr. 1, 2008), pp. 52-60, XP001523147, DOI: 10.1002/ECJ.10081, Sections 2. and 3. figures 6,7, paragraph [02.3] - paragraph [02.4].

Tellado-Mourelo J., "Peak to Average Power Reduction for Multicarrier Modulation", A Dissertation Submitted to the Department of Electrical Engineering and the Committee on Graduate Studies of Stanford University In Partial Fulfillment of the Requirements for the Degree of Doctor of Philosophy, Sep. 1, 1999, (Sep. 1, 1999), XP002463333, 169 pages, figure 3.18, paragraph [03.9], p. 66-p. 99, figure 4.1, p. 100-p. 122, figure 5.1.

ZTE: "PAPR Reduction for OFDMA Using Improved Tone Reservation with Low Complexity," 3GPP Draft, R1-050836 Papr Reduction for OFDMA Using Improved Tone Reservation with Low Complexity, 3rd Generation Partnership Project (3GPP), Mobile Competence Centre; 650, Route Des Lucioles; F-06921, Sophia-Antipolis Cedex; France, Aug. 25, 2005 (Aug. 25, 2005). XP050595992, 14 pages, [retrieved on Aug. 25, 2005] the whole document.

Pantos D., et al., "Peak-to-Average Power Ratio Reduction of OFDM Signals Using Evolutionary Techniques", Journal of Communications and Networks, New York, NY, USA, IEEE, vol. 10, No. 3, Sep. 1, 2008 (Sep. 1, 2008), pp. 233-238, XP011483520, ISSN:1229-2370, DOI: 10.11 09/JC.2008.6388344, p. 235, Left-hand column.

* cited by examiner

MACHINE LEARNING BASED RECEIVER PERFORMANCE IMPROVEMENT USING PEAK REDUCTION TONES

RELATED APPLICATIONS

This application claims the benefit of priority to U.S. Provisional Patent Application Ser. No. 62/980,776 entitled "Machine Learning Based Receiver Performance Improvement Using Peak Reduction Tones" filed on Feb. 24, 2020, and to U.S. Provisional Patent Application Ser. No. 63/009,369 entitled "Machine Learning Based Uplink Coverage Enhancement Using Peak Reduction Tones" filed Apr. 13, 2020. The entire contents of both provisional applications are incorporated herein by reference for all purposes.

BACKGROUND

In wireless communication systems, such as those specified under standards for Fifth Generation (5G) New Radio (NR), the conventional using orthogonal frequency-division multiplexing (OFDM) waveform suffers from large peak-to-average power ratio (PAPR). Mitigating large PAPR can necessitate large amounts of power amplifier back-off, at the cost of degraded power amplifier efficiency.

SUMMARY

Various aspects include systems and methods of wireless communication performed by wireless communication device, such as a base station and mobile wireless devices.

Various aspects may include performing in receiver circuitry of a receiver wireless communication device operations for demodulating wireless transmission waveforms to reconstruct data tones, including receiving, from a transmitter, wireless transmission waveforms that include peak reduction tones (PRTs) that were generated by a PRT neural network in the transmitter, and demodulating the received wireless transmission waveforms using a receiver neural network that has been trained based on outputs of the transmitter to output a reconstruction of the data tones.

Some aspects may further include selecting from among a plurality of trained receiver neural networks stored in the receiver wireless communication device a receiver neural network that has been trained on the PRT neural network being used by the transmitter of the received transmission waveforms. Some aspects may further include receiving from the transmitter of the received transmission waveforms an indicator of the receiver neural network that has been trained on the PRT neural network being used by the transmitter of the received transmission waveforms, wherein selecting a receiver neural network from among a plurality of trained receiver neural networks stored in the receiver wireless communication device comprises selecting the receiver neural network based on the indicator received from the transmitter. Some aspects may further include receiving weights for the receiver neural network from the transmitter, wherein demodulating the received transmission waveforms using the receiver neural network that has been trained based on outputs of the transmitter comprises demodulating the received transmission waveforms using the selected receiver neural network and the weights for the receiver neural network received from the transmitter.

Some aspects may further include sending to the transmitter an indicator of a PRT neural network to be used by the transmitter to insert PRTs into transmission waveforms, wherein the PRT neural network associated with the indicator was used to train the receiver neural network used to demodulate transmission waveforms received from the transmitter. Some aspects may further include transmitting weights for the PRT neural network to the transmitter.

Various aspects may include performing in transmitter circuitry of a transmitter wireless communication device operations for transmitting data tones via wireless transmission waveforms to a receiver, including processing the data tones through a PRT neural network trained to generate PRTs that when combined with the data tones will result in a transmission waveform that will exhibit a peak-to-average power ratio (PAPR) within a PAPR limit threshold, and combining the data tones with PRTs output by the PRT neural network to output a transmission waveform for transmission to a receiving wireless communication device configured with a receiver neural network that has been trained based on outputs of the transmitter circuitry to demodulate wireless transmission waveforms from the transmitter circuitry.

Some aspects may further include transmitting a neural network indicator configured to indicate a receiver neural network for use by the receiving wireless communication device in demodulating the transmitted wireless transmission waveforms, wherein the indicated receiver neural network was trained based on outputs of the transmitter circuitry. Some aspects may further include transmitting weights for the indicated receiver neural network to the receiving wireless communication device. Some aspects may further include selecting from among a plurality of PRT neural networks stored on the receiving wireless communication device a PRT neural network to use in processing the data tones to generate PRTs that was used to train the receiver neural network used in the receiving wireless communication device. Some aspects may further include receiving an indicator of the PRT neural network to use from the receiving wireless communication device, wherein selecting from among a plurality of PRT neural networks stored on the wireless communication device a PRT neural network to use in processing the data tones to generate PRTs comprises selecting the PRT neural network corresponding to the received indicator. Some aspects may further include receiving from the receiving wireless communication device weights for the receiving wireless communication device.

Further aspects may include methods of training a PRT neural network used in transmitting circuitry to insert PRTs into transmitted transmission waveforms and a receiver neural network used in receiver circuitry for demodulating received transmission waveforms to recover a data tone. Such aspects may include training the PRT neural network using data tones to generate PRTs that when inserted into transmitted transmission waveforms with data tones result in time-domain signals for amplification that will satisfy PAPR threshold limits, and training the receiver neural network to demodulate received transmission waveforms from the transmitting circuitry by comparing data tones output of the receiver neural network to data tones applied to the PRT neural network.

In some aspects, training the PRT neural network may include determining an error of the PRT neural network, and using the error to update the PRT neural network. In some aspects, determining an error of the PRT neural network may include determining an error of the PRT neural network based on an amount by which a PAPR of a transmitted transmission waveform exceeds the PAPR threshold.

In some aspects. training the PRT neural network and training the receiver neural network may include training the PRT neural network and training the receiver neural network for the receiver circuitry.

Some aspects may include indicating to the transmitting circuitry a PRT neural network to use for transmitted transmission waveforms for the receiver circuitry.

In some aspects, training the PRT neural network and training the receiver neural network may include training the PRT neural network and training the receiver neural network for the transmitting circuitry.

Some aspects may include indicating to the receiver circuitry a receiver neural network to use for received transmission waveforms from the transmitting circuitry.

Further aspects may include a wireless communication device having transmitting circuitry and/or receiving circuitry configured to perform operations of any of the methods summarized above. Further aspects may include a wireless communication device having means for performing functions of any of the methods summarized above.

BRIEF DESCRIPTION OF THE DRAWINGS

The accompanying drawings, which are incorporated herein and constitute part of this specification, illustrate exemplary embodiments of the claims, and together with the general description given above and the detailed description given below, serve to explain the features of the claims.

Like reference numbers and designations in the various drawings indicate like elements.

DETAILED DESCRIPTION

Figure 1:
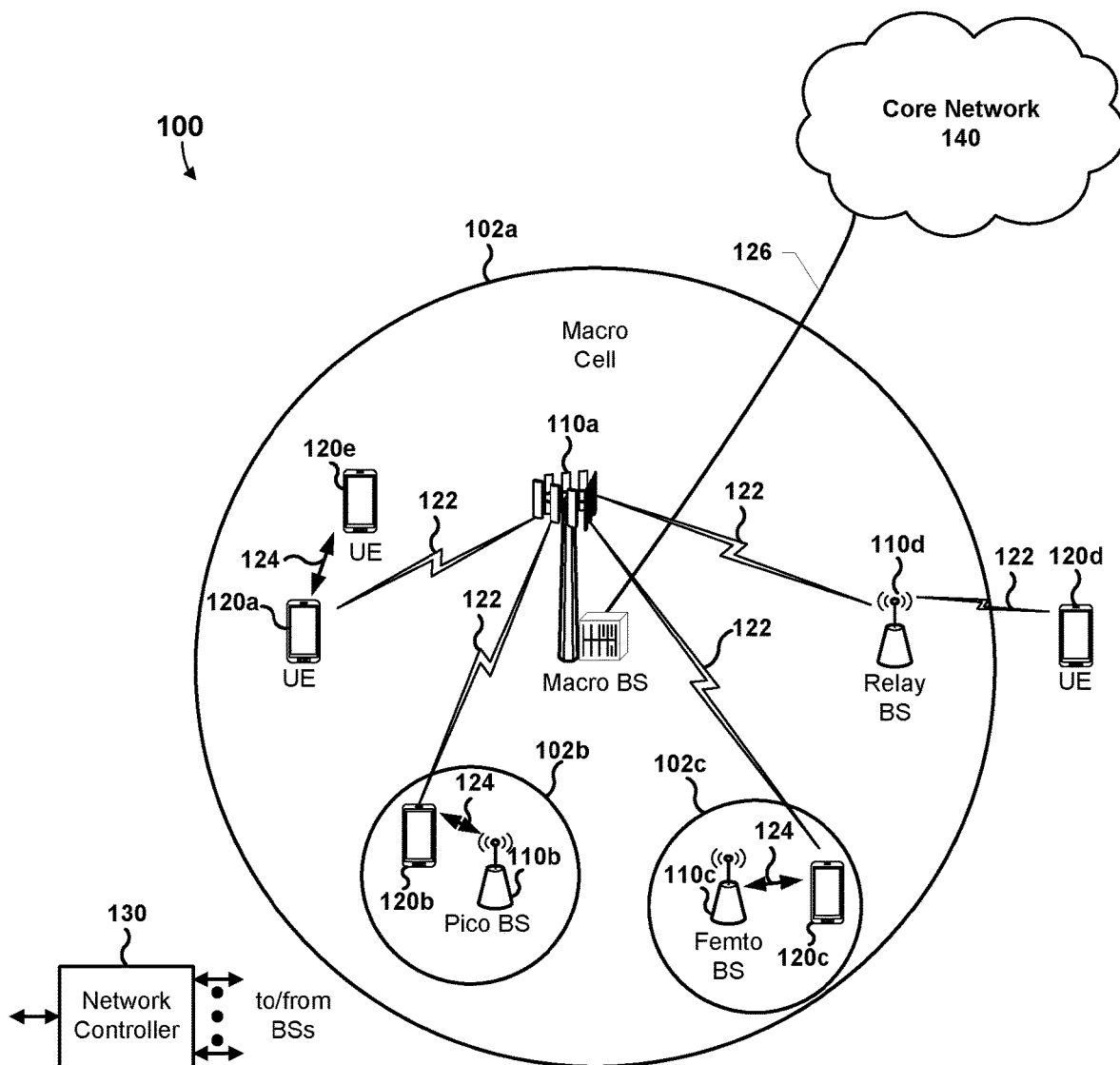
FIG. 1 is a system block diagram illustrating an example of a communications system suitable for implementing any of the various embodiments.

The following description is directed to certain embodiments for the purposes of describing the innovative aspects of this disclosure. However, a person having ordinary skill in the art will readily recognize that the teachings herein may be applied in a multitude of different ways.

Various embodiments provide methods that may be implemented in wireless communication devices (e.g., base stations, wireless access points, mobile devices, etc.) that make use of a trained PRT neural network module on the transmitter side of a wireless communication link to determine PRTs suitable for a given transmission and make use of an associated trained receiver neural network module on the receiver side of the wireless communication link remove PRTs from a received signal and extract information regarding the target data tones that is carried by the PRTs.

The described embodiments may be implemented in any device, system, or network that is capable of transmitting and receiving radio frequency (RF) signals according to any of the Institute of Electrical and Electronics Engineers (IEEE) 16.11 standards, or any of the IEEE 802.11 standards, the Bluetooth® standard, code division multiple access (CDMA), frequency division multiple access (FDMA), time division multiple access (TDMA), Global System for Mobile communications (GSM), GSM/General Packet Radio Service (GPRS), Enhanced Data GSM Environment (EDGE), Terrestrial Trunked Radio (TETRA), Wideband-CDMA (W-CDMA), Evolution Data Optimized (EV-DO), 1×EV-DO, EV-DO Rev A, EV-DO Rev B, High Speed Packet Access (HSPA), High Speed Downlink Packet Access (HSDPA), High Speed Uplink Packet Access (HSUPA), Evolved High Speed Packet Access (HSPA+), Long Teim Evolution (LTE), AMPS, Fifth Generation (5G) New Radio (NR), or other signals that are used to communicate within a wireless, cellular or Internet of Things (IoT) network, such as a system utilizing 3G, 4G, or 5G technology, or further embodiments thereof.

The term "wireless device" is used herein to refer to any one or all of wireless router devices, wireless appliances, cellular telephones, smartphones, portable computing devices, personal or mobile multi-media players, laptop computers, tablet computers, smartbooks, ultrabooks, palmtop computers, wireless electronic mail receivers, multimedia Internet-enabled cellular telephones, medical devices and equipment, biometric sensors/devices, wearable devices including smart watches, smart clothing, smart glasses, smart wrist bands, smart jewelry (such as smart rings, smart bracelets, etc.), entertainment devices (such as wireless gaming controllers, music and video players, satellite radios, etc.), wireless-network enabled Internet of Things (IoT) devices including smart meters/sensors, industrial manufacturing equipment, large and small machinery and appliances for home or enterprise use, wireless communication elements within autonomous and semiautonomous vehicles, wireless devices affixed to or incorporated into various mobile platforms, global positioning system devices, and similar electronic devices that include a memory, wireless communication components and a programmable processor.

The term "system on chip" (SOC) is used herein to refer to a single integrated circuit (IC) chip that contains multiple resources or processors integrated on a single substrate. A single SOC may contain circuitry for digital, analog, mixed-signal, and radio-frequency functions. A single SOC also may include any number of general purpose or specialized processors (digital signal processors, modem processors, video processors, etc.), memory blocks (such as ROM, RAM, Flash, etc.), and resources (such as timers, voltage regulators, oscillators, etc.). SOCs also may include software for controlling the integrated resources and processors, as well as for controlling peripheral devices.

The term "system in a package" (SIP) may be used herein to refer to a single module or package that contains multiple resources, computational units, cores or processors on two or more IC chips, substrates, or SOCs. For example, a SIP may include a single substrate on which multiple IC chips or semiconductor dies are stacked in a vertical configuration. Similarly, the SIP may include one or more multi-chip modules (MCMs) on which multiple ICs or semiconductor dies are packaged into a unifying substrate. A SIP also may include multiple independent SOCs coupled together via high speed communication circuitry and packaged in close proximity, such as on a single motherboard or in a single wireless device. The proximity of the SOCs facilitates high speed communications and the sharing of memory and resources.

The conventional orthogonal frequency-division multiplexing (OFDM) waveform adopted in the 5G NR specification suffers from large peak-to-average power ratio (PAPR). Without other mitigation of PAPR of a waveform, the transmitter may need to reduce power amplification (i.e., implement power amplifier back-off), at the cost of the degraded power amplifier efficiency in order to avoid distortion caused by the power amplifier nonlinearity. A signal processing approach to PAPR reduction includes a tone reservation scheme, in which peak reduction tones (PRT) that are orthogonal to data tones are used to shape the transmission waveforms, i.e., an OFDM symbols containing the PRTs and the data tones, in the time domain. The PRTs are designed to reduce the peaks in the amplitude of the transmission waveforms in the time domain. However, there is no known relation between the data tones and the PRTs when the PRTs are found by the traditional signal processing algorithms. In other words, mapping between the data tones and the PRTs can be arbitrary. As such, a receiver is indifferent to the content of the PRTs, and the PRTs only present overhead to the receiver. When PRTs are paired with data tones, the peak power of the transmission waveform are reduced at the cost of the increased average transmission power and the error vector magnitude (EVM) is maintained for the data tones.

The embodiments described herein use machine learning trained neural networks configured to map data tones to PRTs for transmission from a specific transmitter and/or for transmission to a specific receiver. Machine learning may be used to train a PRT neural network and a receiver neural network pair. In some embodiments, the PRT neural network may be trained to pair a data tone and a PRT based on an input of the data tone. The receiver neural network may be trained to demodulate a transmission waveform of an OFDM symbol having the data tone and the PRT to generate a reconstruction of the data tone based on an input of the transmission waveform. In some embodiments, the PRT neural network and the receiver neural network may be trained for a specific transmitter, such as based on a hardware configuration of a transmitter. In some embodiments, the PRT neural network and the receiver neural network may be trained for a specific receiver, such as based on a hardware configuration of a receiver.

In some embodiments, a transmitter and a receiver may share configurations of a PRT neural network and/or a receiver neural network. For example, a transmitter, such as a wireless device, may share with a receiver, such as a base station or a node, a configuration of a receiver neural network, which may be the receiver neural network trained in conjunction with a PRT neural network implemented by the transmitter, for the receiver to implement. As a further example, the receiver may share with the transmitter a configuration of a PRT neural network, which may be the PRT neural network trained in conjunction with the receiver neural network implemented by the receiver, for the transmitter to implement.

In some embodiments, the transmitter and the receiver may be preconfigured with multiple PRT neural networks and/or receiver neural networks, and sharing the configurations of a PRT neural network and/or a receiver neural network may include sharing an indicator of a configuration of a PRT neural network and/or a receiver neural network. The transmitter and/or the receiver may use the indicator to select the configuration of the PRT neural network and/or the receiver neural network.

In some embodiments, sharing the configurations of a PRT neural network and/or a receiver neural network may include sharing weights resulting from the training of the PRT neural network and/or the receiver neural network. Sharing the configurations of a PRT neural network and/or a receiver neural network may include sending the indicator and/or the weights to the transmitter and/or the receiver.

In some embodiments, the transmitter may use a default PRT neural network and/or a PRT neural network selected in response to receiving an indicator of the configuration of the PRT neural network to generate a PRT for a data tone. The transmitter may generate a transmission waveform by combining the data tones and the PRTs. The transmitter may transmit the transmission waveform to the receiver. The receiver may receive the transmission waveform and use a default receiver neural network and/or a receiver neural network selected in response to receiving an indicator of the configuration of the receiver neural network to demodulate the transmission waveform in order to reconstruct the data tones. For a PRT neural network and a receiver neural network trained together, the PRT neural network used to generate the PRTs to combine with the data tones to generate the transmission waveform may be known to a receiver implementing the receiver neural network. As such, the PRT may contain information to facilitate generating a reconstruction of the data tones. The information contained in the PRT may improve demodulation performance, such as improving accuracy of a reconstruction of the data tones compared to sending the PRTs generated by a traditional signal processing algorithm.

FIG. 1 is a system block diagram illustrating an example communication system 100 suitable for implementing any of the various embodiments. The communications system 100 may be a 5G New Radio (NR) network, or any other suitable network such as a Long Term Evolution (LTE) network.

The communications system 100 may include a heterogeneous network architecture that includes a core network 140 and a variety of mobile devices (illustrated as wireless device 120a-120e in FIG. 1). The communications system 100 may also include a number of base stations (illustrated as the BS 110a, the BS 110b, the BS 110c, and the BS 110d) and other network entities. A base station is an entity that communicates with wireless devices (mobile devices), and also may be referred to as an NodeB, a Node B, an LTE evolved nodeB (eNB), an access point (AP), a radio head, a transmit receive point (TRP), a New Radio base station (NR BS), a 5G NodeB (NB), a Next Generation NodeB (gNB), or the like. Each base station may provide communication coverage for a particular geographic area. In 3GPP, the term "cell" can refer to a coverage area of a base station, a base station subsystem serving this coverage area, or a combination thereof, depending on the context in which the term is used.

A base station 110a-110d may provide communication coverage for a macro cell, a pico cell, a femto cell, another type of cell, or a combination thereof. A macro cell may cover a relatively large geographic area (for example, several kilometers in radius) and may allow unrestricted access by mobile devices with service subscription. A pico cell may cover a relatively small geographic area and may allow unrestricted access by mobile devices with service subscription. A femto cell may cover a relatively small geographic area (for example, a home) and may allow restricted access by mobile devices having association with the femto cell (for example, mobile devices in a closed subscriber group (CSG)). A base station for a macro cell may be referred to as a macro BS. A base station for a pico cell may be referred to as a pico BS. A base station for a femto cell may be referred to as a femto BS or a home BS. In the example illustrated in FIG. 1, a base station 110a may be a macro BS for a macro cell 102a, a base station 110b may be a pico BS for a pico cell 102b, and a base station 110c may be a femto BS for a femto cell 102c. A base station 110a-110d may support one or multiple (for example, three) cells. The terms "eNB", "base station", "NR BS", "gNB", "TRP", "AP", "node B", "5G NB", and "cell" may be used interchangeably herein.

In some examples, a cell may not be stationary, and the geographic area of the cell may move according to the location of a mobile base station. In some examples, the base stations 110a-110d may be interconnected to one another as well as to one or more other base stations or network nodes (not illustrated) in the communications system 100 through various types of backhaul interfaces, such as a direct physical connection, a virtual network, or a combination thereof using any suitable transport network The base station 110a-110d may communicate with the core network 140 over a wired or wireless communication link 126. The wireless device 120a-120e may communicate with the base station 110a-110d over a wireless communication link 122.

The wired communication link 126 may use a variety of wired networks (e.g., Ethernet, TV cable, telephony, fiber optic and other forms of physical network connections) that may use one or more wired communication protocols, such as Ethernet, Point-To-Point protocol, High-Level Data Link Control (HDLC), Advanced Data Communication Control Protocol (ADCCP), and Transmission Control Protocol/Internet Protocol (TCP/IP).

The communications system 100 also may include relay stations (e.g., relay BS 110d). A relay station is an entity that can receive a transmission of data from an upstream station (for example, a base station or a mobile device) and transmit the data to a downstream station (for example, a wireless device or a base station). A relay station also may be a mobile device that can relay transmissions for other wireless devices. In the example illustrated in FIG. 1, a relay station 110d may communicate with macro the base station 110a and the wireless device 120d in order to facilitate communication between the base station 110a and the wireless device 120d. A relay station also may be referred to as a relay base station, a relay base station, a relay, etc.

The communications system 100 may be a heterogeneous network that includes base stations of different types, for example, macro base stations, pico base stations, femto base stations, relay base stations, etc. These different types of base stations may have different transmit power levels, different coverage areas, and different impacts on interference in communications system 100. For example, macro base stations may have a high transmit power level (for example, 5 to 40 Watts) whereas pico base stations, femto base stations, and relay base stations may have lower transmit power levels (for example, 0.1 to 2 Watts).

A network controller 130 may couple to a set of base stations and may provide coordination and control for these base stations. The network controller 130 may communicate with the base stations via a backhaul. The base stations also may communicate with one another, for example, directly or indirectly via a wireless or wireline backhaul.

The wireless devices 120a, 120b, 120c may be dispersed throughout communications system 100, and each wireless device may be stationary or mobile. A wireless device also may be referred to as an access terminal, a terminal, a mobile station, a subscriber unit, a station, etc.

A macro base station 110a may communicate with the communication network 140 over a wired or wireless communication link 126. The wireless devices 120a, 120b, 120c may communicate with a base station 110a-110d over a wireless communication link 122.

The wireless communication links 122, 124 may include a plurality of carrier signals, frequencies, or frequency bands, each of which may include a plurality of logical channels. The wireless communication links 122 and 124 may utilize one or more radio access technologies (RATs). Examples of RATs that may be used in a wireless communication link include 3GPP LTE, 3G, 4G, 5G (e.g., NR), GSM, Code Division Multiple Access (CDMA), Wideband Code Division Multiple Access (WCDMA), Worldwide Interoperability for Microwave Access (WiMAX), Time Division Multiple Access (TDMA), and other mobile telephony communication technologies cellular RATs. Further examples of RATs that may be used in one or more of the various wireless communication links 122, 124 within the communication system 100 include medium range protocols such as Wi-Fi, LTE-U, LTE-Direct, LAA, MuLTEfire, and relatively short range RATs such as ZigBee, Bluetooth, and Bluetooth Low Energy (LE).

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block") may be 12 subcarriers (or 180 kHz). Consequently, the nominal Fast File Transfer (FFT) size may be equal to 128, 256, 512, 1024 or 2048 for system bandwidth of 1.25, 2.5, 5, 10 or 20 megahertz (MHz), respectively. The system bandwidth may also be partitioned into subbands. For example, a subband may cover 1.08 MHz (i.e., 6 resource blocks), and there may be 1, 2, 4, 8 or 16 subbands for system bandwidth of 1.25, 2.5, 5, 10 or 20 MHz, respectively.

While descriptions of some embodiments may use terminology and examples associated with LTE technologies, various embodiments may be applicable to other wireless communications systems, such as a new radio (NR) or 5G network. NR may utilize OFDM with a cyclic prefix (CP) on the uplink (UL) and downlink (DL) and include support for half-duplex operation using time-division duplexing (TDD). A single component carrier bandwidth of 100 MHz may be supported. NR resource blocks may span 12 sub-carriers with a sub-carrier bandwidth of 75 kHz over a 0.1 millisecond (ms) duration. Each radio frame may consist of 50 subframes with a length of 10 ms. Consequently, each subframe may have a length of 0.2 ms. Each subframe may indicate a link direction (i.e., DL or UL) for data transmission and the link direction for each subframe may be dynamically switched. Each subframe may include DL/UL data as well as DL/UL control data. Beamforming may be supported and beam direction may be dynamically configured. Multiple Input Multiple Output (MIMO) transmissions with precoding may also be supported. MIMO configurations in the DL may support up to eight transmit antennas with multi-layer DL transmissions up to eight streams and up to two streams per wireless device. Multi-layer transmissions with up to 2 streams per wireless device may be supported. Aggregation of multiple cells may be supported with up to eight serving cells. Alternatively, NR may support a different air interface, other than an OFDM-based air interface.

Some mobile devices may be considered machine-type communication (MTC) or evolved or enhanced machine-type communication (eMTC) mobile devices. MTC and eMTC mobile devices include, for example, robots, drones, remote devices, sensors, meters, monitors, location tags, etc., that may communicate with a base station, another device (for example, remote device), or some other entity. A wireless node may provide, for example, connectivity for or to a network (for example, a wide area network such as Internet or a cellular network) via a wired or wireless communication link. Some mobile devices may be considered Internet-of-Things (IoT) devices or may be implemented as NB-IoT (narrowband Internet of things) devices. A wireless device 120a-120e may be included inside a housing that houses components of the wireless device, such as processor components, memory components, similar components, or a combination thereof.

In general, any number of communication systems and any number of wireless networks may be deployed in a given geographic area. Each communications system and wireless network may support a particular radio access technology (RAT) and may operate on one or more frequencies. A RAT also may be referred to as a radio technology, an air interface, etc. A frequency also may be referred to as a carrier, a frequency channel, etc. Each frequency may support a single RAT in a given geographic area in order to avoid interference between communications systems of different RATs. In some cases, NR or 5G RAT networks may be deployed.

Figure 2:
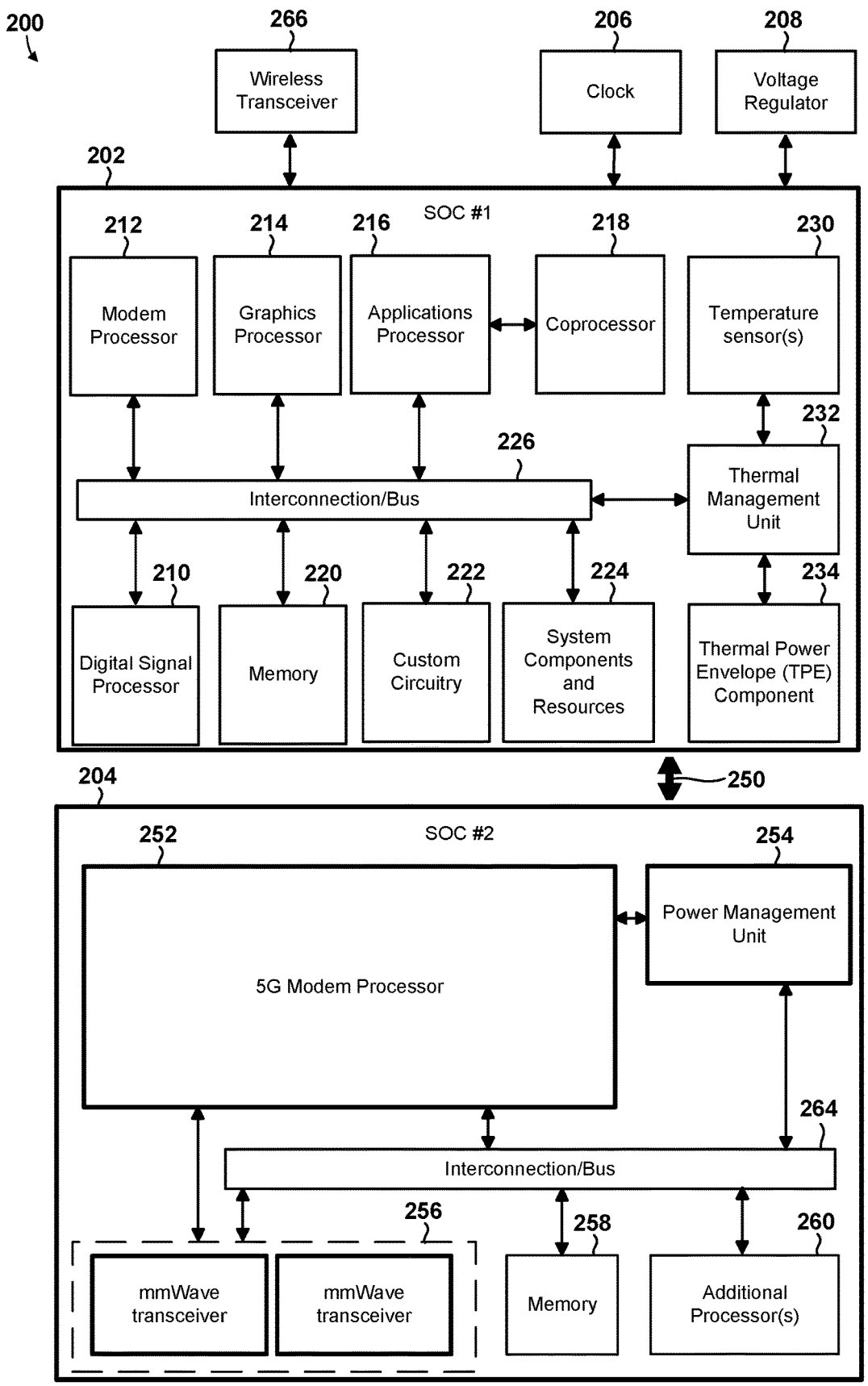
FIG. 2 is a component block diagram illustrating an example computing and wireless modem system suitable for implementing any of the various embodiments.

FIG. 2 is a component block diagram illustrating an example computing and wireless modem system 200 suitable for implementing any of the various embodiments. Various embodiments may be implemented on a number of single processor and multiprocessor computer systems, including a system-on-chip (SOC) or system in a package (SIP).

With reference to FIGS. 1 and 2, the illustrated example computing system 200 (which may be a SIP in some embodiments) includes a two SOCs 202, 204 coupled to a clock 206, a voltage regulator 208, and a wireless transceiver 266 configured to send and receive wireless communications via an antenna (not shown) to/from wireless devices, such as a base station 110a. In some embodiments, the first SOC 202 operate as central processing unit (CPU) of the wireless device that carries out the instructions of software application programs by performing the arithmetic, logical, control and input/output (I/O) operations specified by the instructions. In some embodiments, the second SOC 204 may operate as a specialized processing unit. For example, the second SOC 204 may operate as a specialized 5G processing unit responsible for managing high volume, high speed (e.g., 5 Gbps, etc.), and/or very high frequency short wave length (e.g., 28 GHz mmWave spectrum, etc.) communications.

The first SOC 202 may include a digital signal processor (DSP) 210, a modem processor 212, a graphics processor 214, an application processor 216, one or more coprocessors 218 (e.g., vector co-processor) connected to one or more of the processors, memory 220, custom circuitry 222, system components and resources 224, an interconnection/bus module 226, one or more temperature sensors 230, a thermal management unit 232, and a thermal power envelope (TPE) component 234. The second SOC 204 may include a 5G modem processor 252, a power management unit 254, an interconnection/bus module 264, the plurality of mmWave transceivers 256, memory 258, and various additional processors 260, such as an applications processor, packet processor, etc.

Each processor 210, 212, 214, 216, 218, 252, 260 may include one or more cores, and each processor/core may perform operations independent of the other processors/cores. For example, the first SOC 202 may include a processor that executes a first type of operating system (e.g., FreeBSD, LINUX, OS X, etc.) and a processor that executes a second type of operating system (e.g., MICROSOFT WINDOWS 10). In addition, any or all of the processors 210, 212, 214, 216, 218, 252, 260 may be included as part of a processor cluster architecture (e.g., a synchronous processor cluster architecture, an asynchronous or heterogeneous processor cluster architecture, etc.).

The first and second SOC 202, 204 may include various system components, resources and custom circuitry for managing sensor data, analog-to-digital conversions, wireless data transmissions, and for performing other specialized operations, such as decoding data packets and processing encoded audio and video signals for rendering in a web browser. For example, the system components and resources 224 of the first SOC 202 may include power amplifiers, voltage regulators, oscillators, phase-locked loops, peripheral bridges, data controllers, memory controllers, system controllers, access ports, timers, and other similar components used to support the processors and software clients running on a wireless device. The system components and resources 224 and/or custom circuitry 222 may also include circuitry to interface with peripheral devices, such as cameras, electronic displays, wireless communication devices, external memory chips, etc.

The first and second SOC 202, 204 may communicate via interconnection/bus module 250. The various processors 210, 212, 214, 216, 218, may be interconnected to one or more memory elements 220, system components and resources 224, and custom circuitry 222, and a thermal management unit 232 via an interconnection/bus module 226. Similarly, the processor 252 may be interconnected to the power management unit 254, the mmWave transceivers 256, memory 258, and various additional processors 260 via the interconnection/bus module 264. The interconnection/bus module 226, 250, 264 may include an array of reconfigurable logic gates and/or implement a bus architecture (e.g., CoreConnect, AMBA, etc.). Communications may be provided by advanced interconnects, such as high-performance networks-on chip (NoCs).

The first and/or second SOCs 202, 204 may further include an input/output module (not illustrated) for communicating with resources external to the SOC, such as a clock 206 and a voltage regulator 208. Resources external to the SOC (e.g., clock 206, voltage regulator 208) may be shared by two or more of the internal SOC processors/cores.

In addition to the example SIP 200 discussed above, various embodiments may be implemented in a wide variety of computing systems, which may include a single processor, multiple processors, multicore processors, or any combination thereof.

Figure 3:
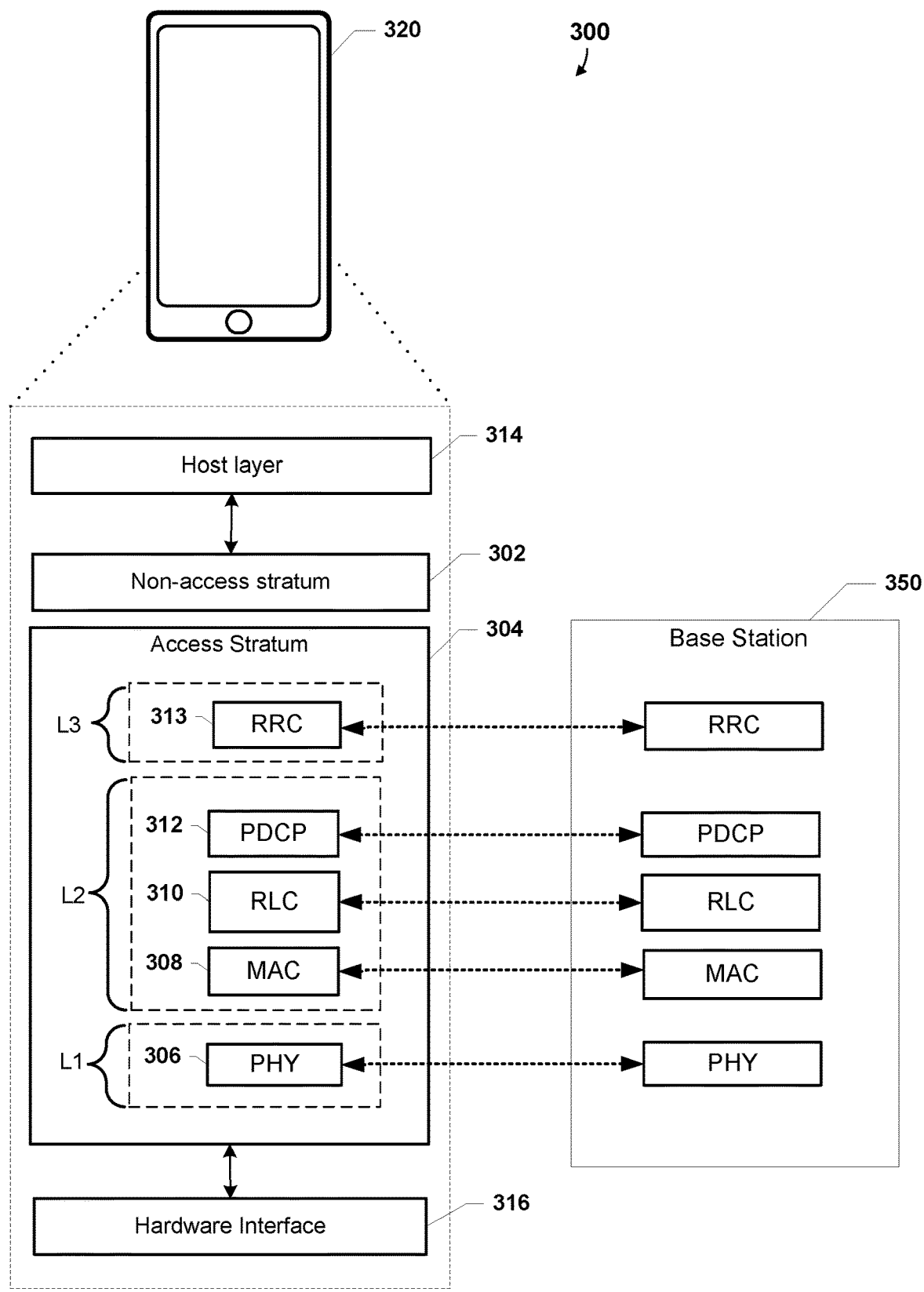
FIG. 3 is a component block diagram illustrating am example of a software architecture including a radio protocol stack for the user and control planes in wireless communications suitable for implementing any of the various embodiments.

FIG. 3 is a component block diagram illustrating a software architecture 300 including a radio protocol stack for the user and control planes in wireless communications suitable for implementing any of the various embodiments. With reference to FIGS. 1-3, the wireless device 320 may implement the software architecture 300 to facilitate communication between a wireless device 320 (e.g., the wireless device 120a-120e, 200) and the base station 350 (e.g., the base station 110a) of a communication system (e.g., 100). In various embodiments, layers in software architecture 300 may form logical connections with corresponding layers in software of the base station 350. The software architecture 300 may be distributed among one or more processors (e.g., the processors 212, 214, 216, 218, 252, 260). While illustrated with respect to one radio protocol stack, in a multi-SIM (subscriber identity module) wireless device, the software architecture 300 may include multiple protocol stacks, each of which may be associated with a different SIM (e.g., two protocol stacks associated with two SIMs, respectively, in a dual-SIM wireless communication device). While described below with reference to LTE communication layers, the software architecture 300 may support any of variety of standards and protocols for wireless communications, and/or may include additional protocol stacks that support any of variety of standards and protocols wireless communications.

The software architecture 300 may include a Non-Access Stratum (NAS) 302 and an Access Stratum (AS) 304. The NAS 302 may include functions and protocols to support packet filtering, security management, mobility control, session management, and traffic and signaling between a SIM(s) of the wireless device (e.g., SIM(s) 204) and its core network 140. The AS 304 may include functions and protocols that support communication between a SIM(s) (e.g., SIM(s) 204) and entities of supported access networks (e.g., a base station). In particular, the AS 304 may include at least three layers (Layer 1, Layer 2, and Layer 3), each of which may contain various sub-layers.

In the user and control planes, Layer 1 (L1) of the AS 304 may be a physical layer (PHY) 306, which may oversee functions that enable transmission and/or reception over the air interface via a wireless transceiver (e.g., 256). Examples of such physical layer 306 functions may include cyclic redundancy check (CRC) attachment, coding blocks, scrambling and descrambling, modulation and demodulation, signal measurements, MIMO, etc. The physical layer may include various logical channels, including the Physical Downlink Control Channel (PDCCH) and the Physical Downlink Shared Channel (PDSCH).

In the user and control planes, Layer 2 (L2) of the AS 304 may be responsible for the link between the wireless device 320 and the base station 350 over the physical layer 306. In the various embodiments, Layer 2 may include a media access control (MAC) sublayer 308, a radio link control (RLC) sublayer 310, and a packet data convergence protocol (PDCP) 312 sublayer, each of which foul logical connections terminating at the base station 350.

In the control plane, Layer 3 (L3) of the AS 304 may include a radio resource control (RRC) sublayer 3. While not shown, the software architecture 300 may include additional Layer 3 sublayers, as well as various upper layers above Layer 3. In various embodiments, the RRC sublayer 313 may provide functions INCLUDING broadcasting system information, paging, and establishing and releasing an RRC signaling connection between the wireless device 320 and the base station 350.

In various embodiments, the PDCP sublayer 312 may provide uplink functions including multiplexing between different radio bearers and logical channels, sequence number addition, handover data handling, integrity protection, ciphering, and header compression. In the downlink, the PDCP sublayer 312 may provide functions that include in-sequence delivery of data packets, duplicate data packet detection, integrity validation, deciphering, and header decompression.

In the uplink, the RLC sublayer 310 may provide segmentation and concatenation of upper layer data packets, retransmission of lost data packets, and Automatic Repeat Request (ARQ). In the downlink, while the RLC sublayer 310 functions may include reordering of data packets to compensate for out-of-order reception, reassembly of upper layer data packets, and ARQ.

In the uplink, MAC sublayer 308 may provide functions including multiplexing between logical and transport channels, random access procedure, logical channel priority, and hybrid-ARQ (HARQ) operations. In the downlink, the MAC layer functions may include channel mapping within a cell, de-multiplexing, discontinuous reception (DRX), and HARQ operations.

While the software architecture 300 may provide functions to transmit data through physical media, the software architecture 300 may further include at least one host layer 314 to provide data transfer services to various applications in the wireless device 320. In some embodiments, application-specific functions provided by the at least one host layer 314 may provide an interface between the software architecture and the general purpose processor 206.

In other embodiments, the software architecture 300 may include one or more higher logical layer (e.g., transport, session, presentation, application, etc.) that provide host layer functions. For example, in some embodiments, the software architecture 300 may include a network layer (e.g., Internet Protocol (IP) layer) in which a logical connection terminates at a packet data network (PDN) gateway (PGW). In some embodiments, the software architecture 300 may include an application layer in which a logical connection terminates at another device (e.g., end user device, server, etc.). In some embodiments, the software architecture 300 may further include in the AS 304 a hardware interface 316 between the physical layer 306 and the communication hardware (e.g., one or more radio frequency (RF) transceivers).

Figure 4A:
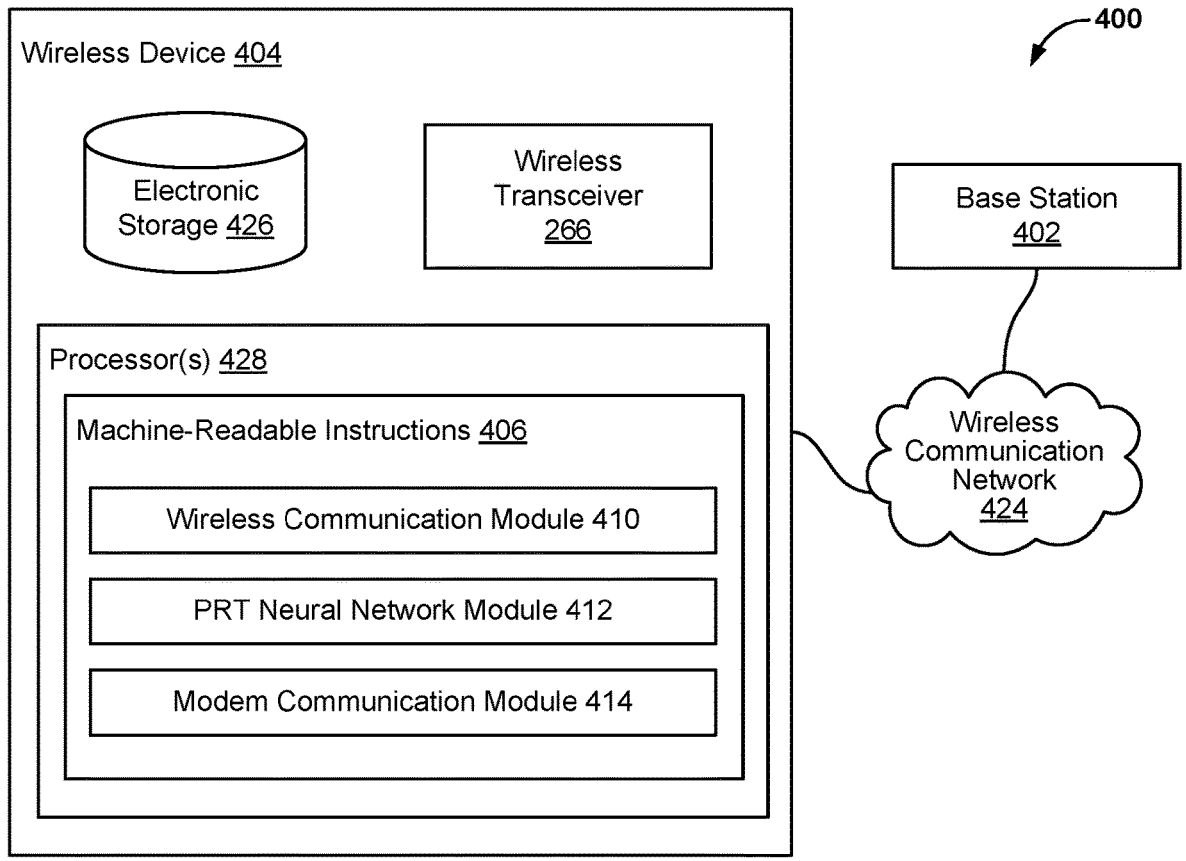
FIGS. 4A and 4B are component block diagrams illustrating an example of a system configured for managing information transmission for wireless communication for implementing any of the various embodiments.
Figure 4B:
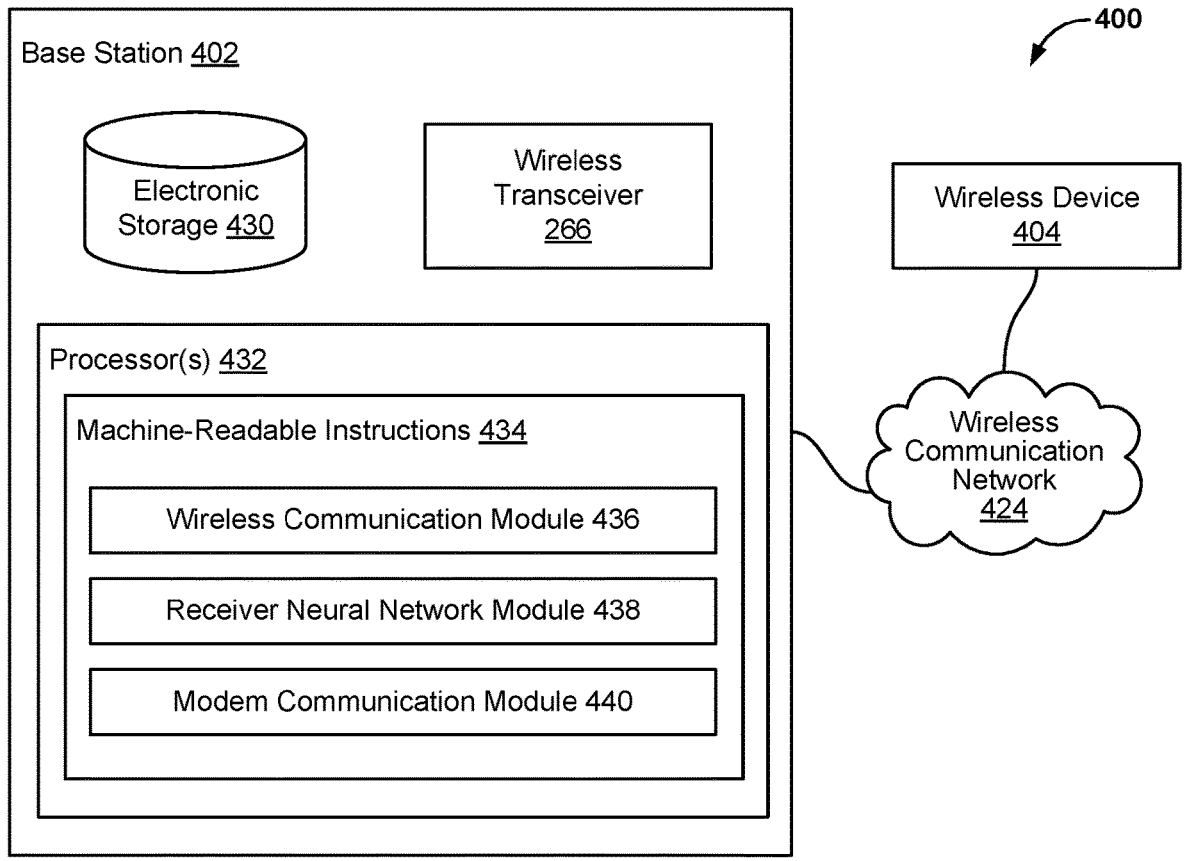

FIGS. 4A and 4B are component block diagrams illustrating a system 400 configured for managing information transmission for wireless communication in accordance with various embodiments. With reference to FIGS. 1-4B, system 400 may include a base station 402 (e.g., 120a-120e, 200, 320) and a wireless device 404 (e.g., 120a-120e, 200, 320). The base station 402 and the wireless device 404 may communicate over a wireless communication network 424 (aspects of which are illustrated in FIG. 1).

The base station 402 and/or the wireless device 404 may include one or more processors 428, 432 (e.g., 210, 212, 214, 216, 218, 252, 260) coupled to electronic storage 426, 430 and a wireless transceiver 266. The wireless transceiver 266 may be configured to receive messages to be sent in uplink transmissions from the processor(s) 428, 432, and to transmit such messages via an antenna (not shown) to a wireless communication network 424 for relay to the base station 402 and/or wireless device 404. Similarly, the wireless transceiver 266 may be configured to receive messages from the base station 402 and/or wireless device 404 in downlink transmissions from the wireless communication network 424 and pass the messages (e.g., via a modem (e.g., 252) that demodulates the messages) to the one or more processors 428, 432.

The processor(s) 428, 432 may be configured by machine-readable instructions 406, 434. Machine-readable instructions 406 may include one or more instruction modules. The instruction modules may include computer program modules. The instruction modules may include one or more of a neural network training module 410, 436, a PRT neural network module 412, a receiver neural network module 438, a wireless communication module 414, 440, or other instruction modules.

The neural network training module 410, 436 may be configured to train the PRT neural network and/or a receiver neural network on a data set of data tones and for accurate reconstruction of the data tones, within a threshold of error.

The PRT neural network module 412 may be configured to apply a PRT neural network to the data tones to generate PRTs for combination with the data tones to reduce PAPR of the transmission waveforms. The PRT neural network may be trained to generate PRTs so that a trained receiver neural network can accurately generate reconstructions of the data tones from transmission waveforms that are made up of a combination of the data tones and the PRTs.

The receiver neural network module 438 may be configured to apply a receiver neural network to the transmission waveforms to accurately generate reconstructions of data tones. The receiver neural network may be trained so that the generated PRTs from a trained PRT neural network provide information to a trained receiver neural network to aid in accurately generating reconstructions of data tones from transmission waveforms made up of a combination of the data tones and PRTs.

The wireless communication module 414, 440 may be configured to transmit indicators of the PRT neural network and/or receiver neural network, weights of the PRT neural network and/or receiver neural network, and/or the transmission waveforms between the wireless device 404 and the based station 402.

In some embodiments, the base station 402 and wireless device 404 may be operatively linked via one or more electronic communication links. For example, such electronic communication links may be established, at least in part, via a network such as the Internet and/or other networks. However, this example is not intended to be limiting, and the scope of this disclosure includes embodiments in which the base station 402 and wireless device 404 may be operatively linked via some other communication media.

The electronic storage 426, 430 may include non-transitory storage media that electronically stores information. The electronic storage media of electronic storage 426, 430 may include one or both of system storage that is provided integrally (i.e., substantially non-removable) with the base station 402 or wireless device 404 and/or removable storage that is removably connectable to the base station 402 or wireless device 404 via, for example, a port (e.g., a universal serial bus (USB) port, a firewire port, etc.) or a drive (e.g., a disk drive, etc.). Electronic storage 426, 430 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 426, 430 may include one or more virtual storage resources (e.g., cloud storage, a virtual private network, and/or other virtual storage resources). Electronic storage 426, 430 may store software algorithms, information determined by processor(s) 428, 432, information received from the base station 402 or wireless device 404, or other information that enables the base station 402 or wireless device 404 to function as described herein.

Processor(s) 428, 432 may be configured to provide information processing capabilities in the base station 402. As such, the processor(s) 428, 432 may include one or more of a digital processor, an analog processor, a digital circuit designed to process information, an analog circuit designed to process information, a state machine, and/or other mechanisms for electronically processing information. Although the processor(s) 428, 432 are illustrated as single entities, this is for illustrative purposes only. In some embodiments, the processor(s) 428, 432 may include a plurality of processing units and/or processor cores. The processing units may be physically located within the same device, or processor(s) 428, 432 may represent processing functionality of a plurality of devices operating in coordination. The processor(s) 428, 432 may be configured to execute modules 408-414 and modules 436-440 and/or other modules by software; hardware; firmware; some combination of software, hardware, and/or firmware; and/or other mechanisms for configuring processing capabilities on processor(s) 428, 432. As used herein, the term "module" may refer to any component or set of components that perform the functionality attributed to the module. This may include one or more physical processors during execution of processor readable instructions, the processor readable instructions, circuitry, hardware, storage media, or any other components.

The description of the functionality provided by the different modules 410-414 and modules 436-440 described herein is for illustrative purposes, and is not intended to be limiting, as any of modules 410-414 and modules 436-440 may provide more or less functionality than is described. For example, one or more of the modules 410-414 and modules 436-440 may be eliminated, and some or all of its functionality may be provided by other modules 410-414 and modules 436-440. As another example, the processor(s) 428, 432 may be configured to execute one or more additional modules that may perform some or all of the functionality attributed below to one of the modules 410-414 and modules 436-440.

Figure 5:
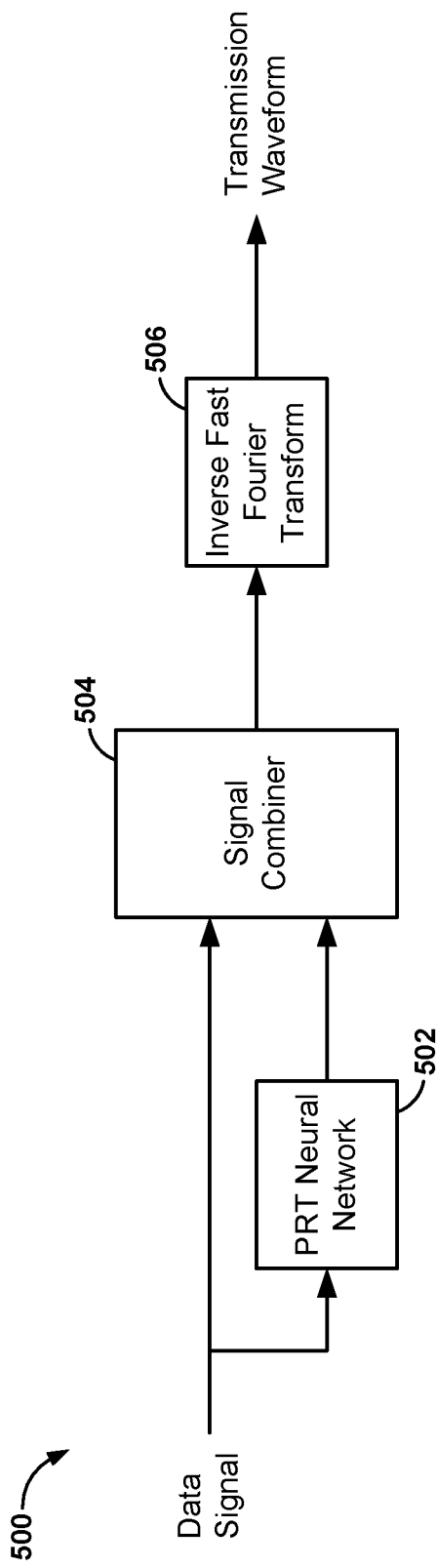
FIG. 5 is a component block diagram illustrating an example of an encoder circuit configured to implement machine learning and/or machine learning based encoding for receiver performance improvement using peak reduction tones (PRTs) in accordance with various embodiments.

FIG. 5 illustrates a functional block diagram including an example encoder circuit 500 configured to implement machine learning and/or machine learning based encoding for inserting PRTs into a transmission waveform in accordance with various embodiments. With reference to FIGS. 1-5, a transmitter (e.g., wireless device 120a-120e, 200, 320, 404) may include an encoder 500. The encoder 500 may be implemented in hardware, software executing on a processor, and/or a combination of hardware and software executing on the processor. The encoder 500 may be may be a standalone component of the transmitter, an integral component of an SoC (e.g., SoC 200, 204), and/or an integral hardware and/or software component of a processors (e.g., processors 210, 212, 214, 216, 218, 252, 260, 428). The encoder 500 may include a PRT neural network 502, a signal combiner 504, and an inverse fast Fourier transform component 506. The encoder 500 may use machine learning trained neural networks configured to map data tones and PRTs for transmission from a specific transmitter and/or to a specific receiver.

Figure 6:
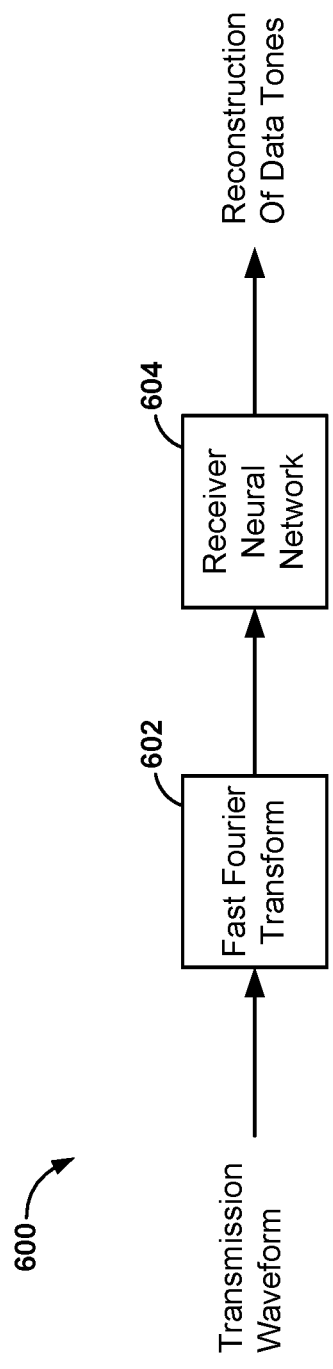
FIG. 6 is a component block diagram illustrating an example of a neural network decoder configured to implement machine learning and/or machine learning based decoding for receiver performance improvement using PRTs in accordance with various embodiments.

FIG. 6 illustrates an example decoder 600 configured to implement machine learning and/or machine learning based decoding to extract PRTs from a received transmission waveform and use information from this process to improve receiver performance in estimating the original data tone in accordance with various embodiments. With reference to FIGS. 1-6, a receiver (e.g., base station 110a-110d, 350, 402) may include a decoder 600. The decoder 600 may be implemented in hardware, software executing on a processor, and/or a combination of hardware and software executing on the processor. The decoder 600 may be may be a standalone component of the receiver, an integral component of an SoC (e.g., SoC 200, 204), and/or an integral hardware and/or software component of a processors (such as the processors 210, 212, 214, 216, 218, 252, 256, 260, 432). The decoder 600 may include a fast Fourier transform component 602 and a receiver neural network 604. The decoder 600 may use machine learning trained neural networks configured to demodulate transmission waveforms, including data tones and PRTs, received from a specific transmitter and/or by a specific receiver.

Referring to both FIGS. 5 and 6 together, machine learning may be used to train a PRT neural network 502 and a receiver neural network 604 pair. Machine learning methods may be implemented on the transmitter side and/or the receiver separately, during which the transmitter and/or the receiver may implement a PRT neural network 502 and a receiver neural network 604. The PRT neural network 502 may be trained to receive data tones as inputs and output PRTs that are combined with the data tones in a signal combiner 504. When the combined signal is transformed to the time domain by an inverse Fast Fourier Transform 506 the result is a transmission waveform with reduced peaks to reduce PAPR suitable for amplification for transmission. On the receiver side, a receiver neural network 604 may be trained to demodulate the transmission waveform, that is a combination of the data tones and the PRTs, to generate a reconstruction of the data tones based on an input of the transmission waveform.

In a non-limiting example, the PRT neural network 502 and the receiver neural network 604 pair may be implemented as an autoencoder using unsupervised machine learning. The PRT neural network 502 and the receiver neural network 604 pair may be trained such that the PRT neural network 502 generates a PRT to combine with a data tone so that the receiver neural network 604 may accurately generate a reconstruction of the data tone, such as within a threshold of error. The error in the reconstructed data tone may be determined by comparison of the reconstruction of the data tone to the data tone. In some embodiments, the PRT neural network 502 and the receiver neural network 604 may be trained for a specific transmitter, such as by being trained using the hardware configuration of the transmitter.

In some embodiments, the PRT neural network 502 and the receiver neural network 604 may be trained for a specific receiver, such as by being trained using a hardware configuration of the receiver. For example, the PRT neural network 502 and receiver neural network 604 pair may be trained using a specific transmitter and/or a transmitter similar to the specific transmitter, such as a transmitter that uses a same hardware and/or software configuration, such as a benchmark transmitter. As a further example, the PRT neural network 502 and receiver neural network 604 pair may be trained using a specific receiver and/or a receiver similar to the specific receiver, such as a receiver that uses a same hardware and/or software configuration, such as a benchmark receiver.

A transmitter and a receiver may share configurations of the PRT neural network 502 and/or the receiver neural network 604. The transmitter may share the configurations of the receiver neural network 604 by wirelessly transmitting the configurations of the receiver neural network 604 to the receiver. For example, the transmitter may share with the receiver a configuration of the receiver neural network 604 for the receiver to implement, which may be the receiver neural network 604 trained in conjunction with the PRT neural network 502 implemented by the transmitter.

In some embodiments, the receiver may be preconfigured with multiple receiver neural networks 604. Sharing the configuration of the receiver neural network 604 may include sharing an indicator of a configuration of the receiver neural network 604. The receiver may use the indicator to select the configuration of the receiver neural network 604 from the multiple receiver neural networks 604.

In some embodiments, sharing the configurations oft the receiver neural network 604 may include sharing weights resulting from the training of the PRT neural network 502 and/or the receiver neural network 604. Sharing the configurations of the receiver neural network 604 may include sending the indicator and/or the weights to the receiver. In some embodiments, the weights may be the indicator.

The receiver may share the configurations of the PRT neural network 502 by wirelessly transmitting the configurations of the PRT neural network 502 to the transmitter. For example, the receiver may share with the transmitter a configuration of the PRT neural network 502 for the transmitter to implement, which may be the PRT neural network 502 trained in conjunction with the receiver neural network 604 implemented by the receiver. In some embodiments, the transmitter may be preconfigured with multiple PRT neural networks 502. Sharing the configurations of the PRT neural network 502 may include sharing an indicator of a configuration of the PRT neural network 502. The transmitter may use the indicator to select the configuration of the PRT neural network 502 from the multiple PRT neural networks 502. In some embodiments, sharing the configurations of the PRT neural network 502 may include sharing weights resulting from the training of the PRT neural network 502 and/or the receiver neural network 604. Sharing the configurations of the PRT neural network 502 may include sending the indicator and/or the weights to the transmitter. In some embodiments, the weights may be the indicator.

The transmitter may use the PRT neural network 502 to generate PRTs to reduce PAPR within the transmitter, and then the receiver may use a corresponding trained receiver neural network 604 in demodulating (i.e., decoding) transmitted waveforms received from the transmitter. In various embodiments, the transmitter may use a trained PRT neural network 502 to generate PRTs as data tones are received for transmission (i.e., generating PRTs "on the fly"). By using a receiver neural network 604 that was trained in conjunction with (or using outputs from) the transmitter PRT neural network 502, the receiver may more accurately reconstruct data tones from the received waveform than achievable using conventional demodulation circuitry. To enable this benefit, some embodiments include operations to coordinate between the transmitter and the receiver so that the trained PRT neural network used in the transmitter corresponds to the trained receiver neural network used in the receiver and vice versa. In some embodiments, the transmitter may use a PRT neural network 502 selected in response to receiving an indicator of the configuration of the PRT neural network 502. In some embodiments, the transmitter may use a PRT neural network 502 that is preconfigured on the transmitter. A signal combiner 504 of the transmitter may receive data tones and PRTs and generate a transmission waveform by combining the data tones and the PRTs. The signal combiner 504 may combine the data tones and the PRTs by allocating the PRTs to subcarriers that are not allocated to the data tones. An inverse fast Fourier transform component 506 of the transmitter may receive the transmission waveform and convert the transmission waveform from the frequency domain to the time domain. The transmitter may transmit the transmission waveform in the time domain to the receiver.

The receiver may receive a transmission waveform in the time domain and a fast Fourier transform component 602 of the receiver may convert the transmission waveform from the time domain to the frequency domain. The receiver may use the receiver neural network 604 to demodulate the transmission waveform to generate a reconstruction of the data signal. The receiver neural network 604 may receive the transmission waveform in the frequency domain and demodulate the transmission waveform to generate a reconstruction of the data tones. In some embodiments, the receiver may use a receiver neural network 604 that is preconfigured on the receiver. In some embodiments, the receiver may use a receiver neural network 604 selected in response to receiving an indicator of the configuration of the receiver neural network 604.

For a PRT neural network 502 and a receiver neural network 604 trained together, the means used to generate the PRTs by the PRT neural network 502 to combine with the data tones may be known to the receiver implementing the receiver neural network 604. As such, the PRTs may contain information for demodulating the transmission waveform that a trained receiver neural network 604 can use to generate a reconstruction of the data tones. The information contained in the PRTs may enable a receiver using a trained receiver neural network 604 to improve demodulation performance, such as improving accuracy of a reconstruction of the data tones compared to sending the transmission waveforms with PRTs generated by a traditional signal processing algorithm and demodulating using conventional demodulation circuitry.

Figure 7:
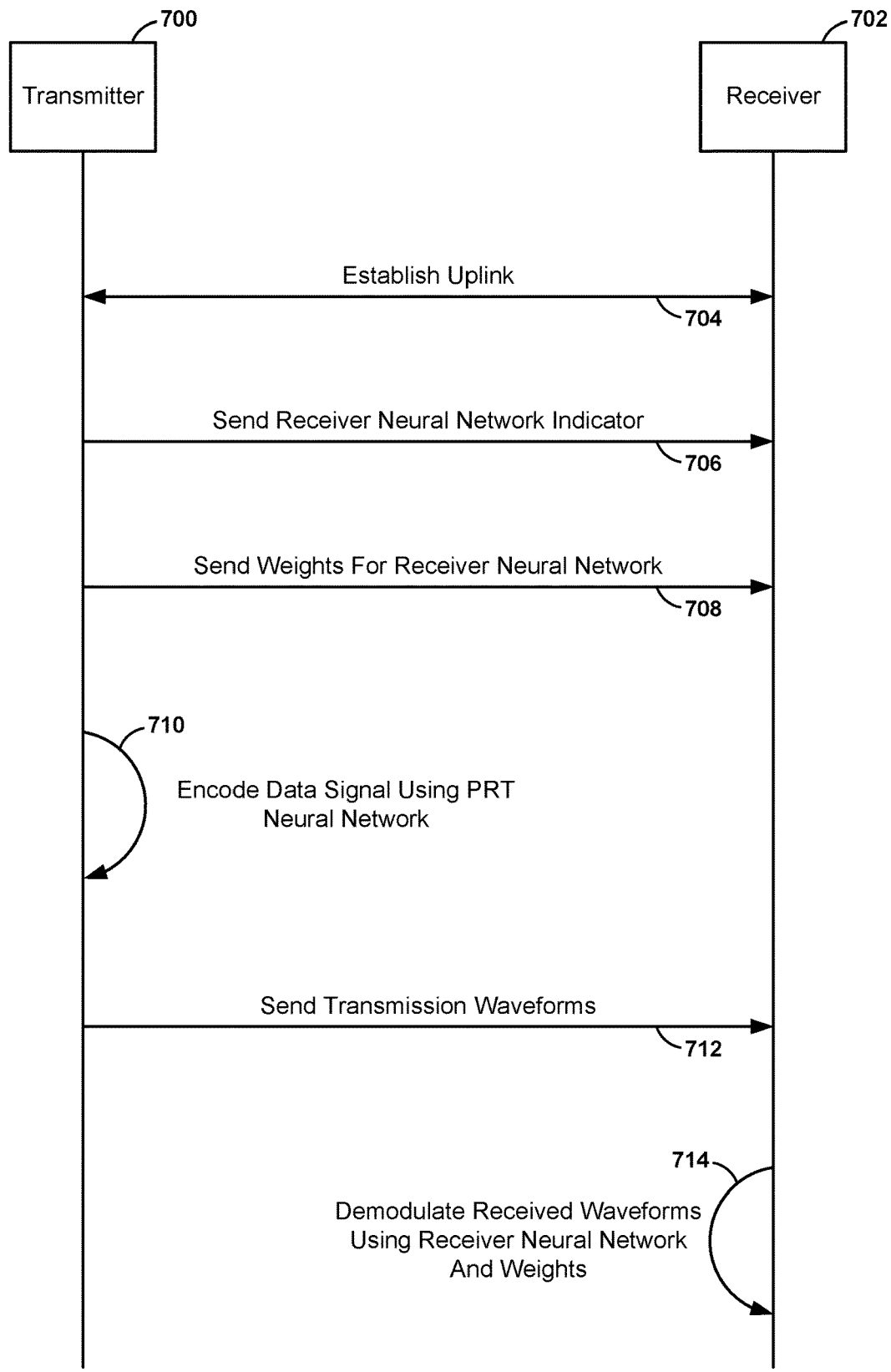
FIG. 7 is a component signaling diagram illustrating an example of a system configured to implement machine learning based encoding and decoding for receiver performance improvement using PRTs in accordance with various embodiments.

FIG. 7 illustrates an example of a system configured to implement machine learning based encoding and decoding for receiver performance improvement using PRTs in accordance with various embodiments. With reference to FIGS. 1-7, a transmitter 700 (e.g., wireless device 120a-120e, 200, 320, 404) may indicate to a receiver 702 (e.g., base station 110a-110d, 350, 402) a receiver neural network (e.g., receiver neural network 604) to use to decode a transmission waveform to generate a reconstruction of data tones.

The transmitter 700 and the receiver 702 may establish an uplink 704. The transmitter 700 may send a receiver neural network indicator 706 to the receiver 702. The receiver neural network indicator may be configured to indicate to the receiver 702 a receiver neural network to select from multiple receiver neural networks to decode a transmission waveform from the transmitter 700. In some embodiments, the receiver neural network indicator may be a reference, such as a flag bit in a signal, a content of a value in the signal, a quality of the signal, etc. configured to indicate to the receiver 702 the receiver neural network to select. In some embodiments, the receiver neural network indicator may be an indicator of the receiver neural network to select. In some embodiments, the receiver neural network indicator may be an indicator of a PRT neural network (e.g., PRT neural network 502), which the transmitter 700 is configured with to generate a transmission waveform, from which the receiver 702 may determine the receiver neural network to select. In some embodiments, the receiver neural network indicator may be weights for use with the receiver neural network from which the receiver 702 may determine the receiver neural network to select. In some embodiments, the receiver 702 may use the receiver neural network indicator as a value for a hash function, look up table, data structure location, etc. for selecting the receiver neural network.

The transmitter 700 may send weights for the receiver neural network 708 to the receiver 702. The weights may be the weights for the receiver 702 to use in implementing the selected receiver neural network for demodulating the transmission waveform to generate a reconstruction of the data tones. In some embodiments, the weights may be the receiver neural network indicator, and sending the weights for the receiver neural network 708 may be combined with sending the receiver neural network indicator 706.

The transmitter 700 may encode the data tones into PRTs using the PRT neural network 710. The PRT neural network of the transmitter 700 used to encode the data tones may be the PRT neural network trained in conjunction with the receiver neural network. The PRT neural network may receive the data tones and generate PRTs, based on the training of the PRT neural network and the receiver neural network, which may result in the receiver neural network accurately generating a reconstruction of the data tones. A signal combiner (e.g., signal combiner 504) may receive and combine the data tones and the PRTs, generating a transmission waveform. An inverse fast Fourier transform component (e.g., inverse fast Fourier transform component 506) may receive the transmission waveform in the frequency domain and convert the transmission waveform to the time domain. The transmitter 700 may send the transmission waveform in the time domain 712 to the receiver 702.

The receiver 702 may receive the transmission waveform and decode the transmission waveform using the receiver neural network and the weights 714. A fast Fourier transform component (e.g., fast Fourier transfer component 602) may receive the transmission waveform in the time domain and convert the transmission waveform to the frequency domain. The receiver neural network used to demodulate the transmission waveform may be a receiver neural network selected based on the indicator received from the transmitter 700. The weights the receiver 702 may use with the receiver neural network may be the weights received from the transmitter 700. The receiver neural network may receive the transmission waveform in the frequency domain and use the received weights to demodulate the transmission waveform. Demodulating the transmission waveform may generate a reconstruction of the data tones.

Figure 8:
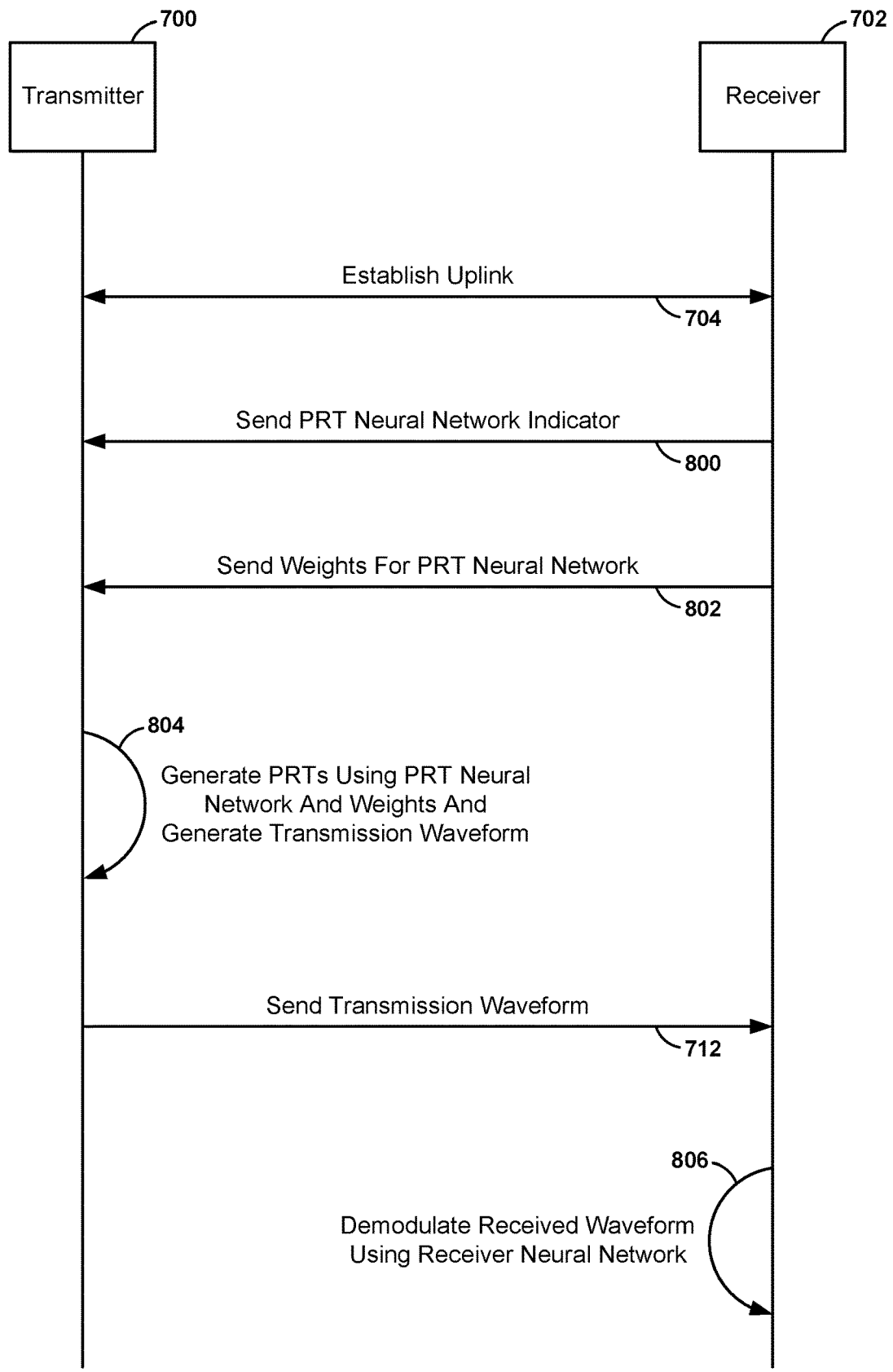
FIG. 8 is a component signaling diagram illustrating an example of a system configured to implement machine learning based encoding and decoding for receiver performance improvement using PRTs in accordance with various embodiments.

FIG. 8 illustrates an example of a system configured to implement machine learning based encoding and decoding for receiver performance improvement using PRTs in accordance with various embodiments. With reference to FIGS. 1-8, a receiver 702 (e.g., base station 110*a*-110*d*, 350, 402) may indicate to a transmitter 700 (e.g., wireless device 120*a*-120*e*, 200, 320, 404) a PRT neural network (e.g., PRT neural network 502) to use to encode data tones into PRTs to generate a transmission waveform.

The transmitter 700 and the receiver 702 may establish an uplink 704. The receiver 702 may send a PRT neural network indicator 800 to the transmitter 700. The PRT neural network indicator may be configured to indicate to the transmitter 700 a PRT neural network to select from multiple PRT neural networks to encode data tones into PRTs by the transmitter 700. In some embodiments, the PRT neural network indicator may be a reference, such as a flag bit in a signal, a content of a value in the signal, a quality of the signal, etc. configured to indicate to the transmitter 700 the PRT neural network to select. In some embodiments, the PRT neural network indicator may be an indicator of the PRT neural network to select. In some embodiments, the PRT neural network indicator may be an indicator of a receiver neural network (e.g., receiver neural network 604), which the receiver 702 is configured with to decode a transmission waveform, from which the transmitter 700 may determine the PRT neural network to select. In some embodiments, the PRT neural network indicator may be weights for use with the PRT neural network from which the transmitter 700 may determine the PRT neural network to select. In some embodiments, the transmitter 700 may use the PRT neural network indicator as a value for a hash function, look up table, data structure location, etc. for selecting the PRT neural network.

The receiver 702 may send weights for the PRT neural network 802 to the transmitter 700. The weights may be the weights for the transmitter 700 to use in implementing the selected PRT neural network for generating a PRT to generate a transmission waveform. In some embodiments, the weights may be the PRT neural network indicator, and sending the weights for the PRT neural network 802 may be combined with sending the PRT neural network indicator 800.

The transmitter 700 may encode the data tones into PRTs using the PRT neural network and the weights 804. The PRT neural network the transmitter 700 may use to encode the data tones into PRTs may be an PRT neural network selected based on the indicator received from the receiver 702. The weights the transmitter 700 may use with the PRT neural network to encode the data tones into PRTs may be the weights received from the receiver 702. The PRT neural network may receive the data tones and use the received weights to generate PRTs, based on the training of the PRT neural network and the receiver neural network, which may result in the receiver neural network accurately generating a reconstruction of the data tones. A signal combiner (e.g., signal combiner 504) may receive and combine the data tones and the PRTs, generating a transmission waveform. An inverse fast Fourier transform component (e.g., inverse fast Fourier transform component 506) may receive the transmission waveform in the frequency domain and convert the transmission waveform to the time domain. The transmitter 700 may send the transmission waveform in the time domain 712 to the receiver 702.

The receiver 702 may receive the transmission waveform and decode the transmission waveform using the receiver neural network 806. A fast Fourier transform component (e.g., fast Fourier transfer component 602) may receive the transmission waveform in the time domain and convert the transmission waveform to the frequency domain. The receiver neural network the receiver 702 may use to decode the transmission waveform may be the receiver neural network trained in conjunction with the PRT neural network. The receiver neural network may receive the transmission waveform in the frequency domain and demodulate the transmission waveform to generate a reconstruction of the data tones. As part of the demodulating the received signal, the receiver neural network extracts the PRTs to obtain the data tones, but also uses information that is inherent in the way the PRTs were generated by the PRT neural network to improve the accuracy of the reconstructed data tones.

Figure 9:
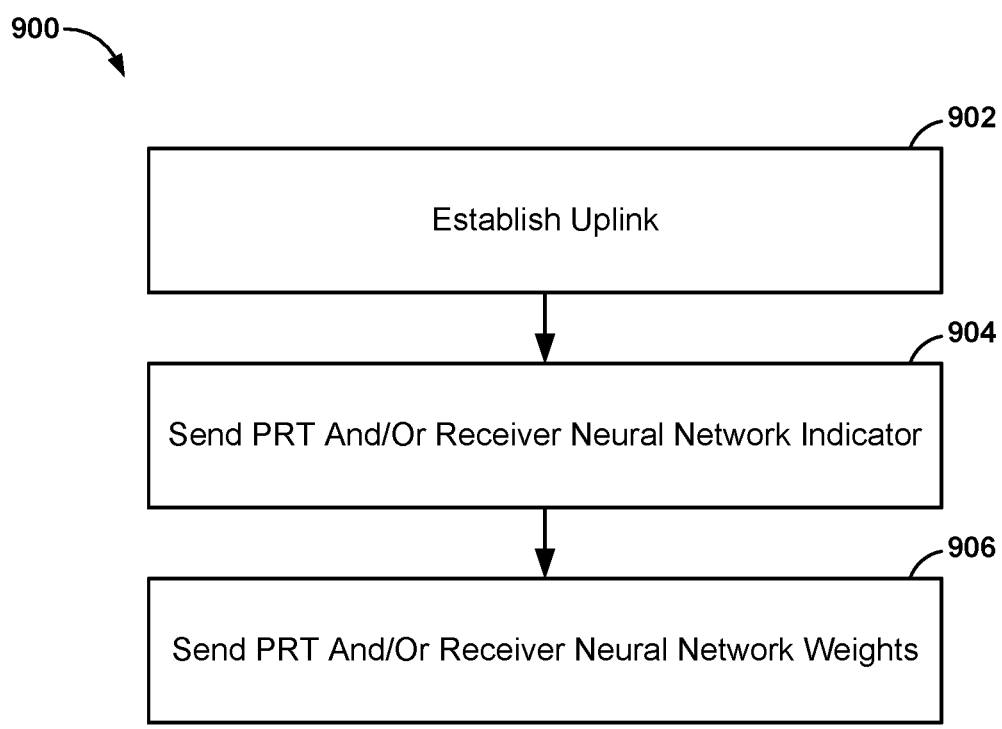
FIG. 9 is a process flow diagram illustrating an example of a method for transmitting machine learning based data for receiver performance improvement using PRTs in accordance with various embodiments.

FIG. 9 illustrates of a method for transmitting machine learning based data for receiver performance improvement using PRTs in accordance with various embodiments. With reference to FIGS. 1-9, the method 900 may be implemented in a computing device (e.g., base station 110*a*-110*d*, 350, 402, wireless device 120*a*-120*e*, 200, 320, 404, transmitter 700, receiver 702), in general purpose hardware, in dedicated hardware, in software executing in a processor (e.g., processor 210, 212, 214, 216, 218, 252, 256, 260, 428, 432), or in a combination of a software-configured processor and dedicated hardware, such as a processor executing software within an peak reduction encoder and/or decoder system (e.g., processor 210, 212, 214, 216, 218, 252, 256, 260, 428, 432, encoder 500, decoder 600) that includes other individual components, and various memory/cache controllers. In order to encompass the alternative configurations enabled in various embodiments, the hardware implementing the method 900 is referred to herein as a "wireless communication device."

In block 902, the wireless communication device may establish an uplink with another wireless communication device. Establishing the uplink may be initiated by the wireless communication device and established based on communication signals and data transmitted between the wireless communication devices. The uplink may be established via various know means, including means for establishing an up link in a 5G NR network. In some embodiments, establishing the uplink in block 902 may occur between a transmitter and a receiver. In some embodiments, establishing the uplink in block 902 may occur between a wireless device and a base station.

In block 904, the wireless communication device may send a PRT neural network and/or a receiver neural network. The receiver neural network may be a receiver neural network trained in conjunction with a PRT neural network used by the wireless communication device. In some embodiments, the transmitter and/or the wireless device may send the receiver neural network in block 904.

In some embodiments, sending the PRT neural network in block 904 may be implemented by sending an indicator of the PRT neural network configured to indicate to the other wireless communication device which PRT neural network (e.g., PRT neural network 502) to choose from among multiple PRT neural networks preconfigured on the other wireless communication device. In some embodiments, sending the receiver neural network may be implemented by sending an indicator of the receiver neural network (e.g., receiver neural network 604) configured to indicate to the other wireless communication device which receiver neural network to choose from among multiple receiver neural networks preconfigured on the another wireless communication device. In some embodiments, the indicator may be a reference, such as a flag bit in a signal, a content of a value in the signal, a quality of the signal, etc. configured to indicate to the another wireless communication device the PRT neural network and/or the receiver neural network to select. In some embodiments, the indicator may be an indicator of the PRT neural network and/or the receiver neural network to select. In some embodiments, the indicator may be an indicator of a PRT neural network, which the transmitting wireless communication device is configured with to generate a transmission waveform, from which the receiving wireless communication device may determine the receiver neural network to select. In some embodiments, the indicator may be an indicator of a receiver neural network, which the receiving wireless communication device is configured with to decode a transmission waveform, from which the transmitting wireless communication device may determine the PRT neural network to use to generate PRTs. In some embodiments, the indicator may be weights for use with the PRT neural network and/or the receiver neural network from which the other wireless communication device may determine the PRT neural network and/or the receiver neural network to select. In some embodiments, the another wireless communication device may use the indicator as a value for a hash function, look up table, data structure location, etc. for selecting the PRT neural network and/or the receiver neural network.

In some embodiments, the wireless communication device may send the PRT neural network to the other wireless communication device. The PRT neural network may be a PRT neural network trained in conjunction with a receiver neural network used by the wireless communication device. In some embodiments, the receiver and/or the base station may send the PRT neural network in block 904. In some embodiments, the wireless communication device may send the receiver neural network to the other wireless communication device.

In block 906, the wireless communication device may send the PRT neural network and/or a receiver neural network weights. The wireless communication device may send the weights to the other wireless communication device. The weights may be the weights for the transmitting wireless communication device to use in implementing the selected PRT neural network for generating PRTs to generate a transmission waveform. In some embodiments, the weights may be the PRT neural network indicator, and sending the weights for the PRT neural network in block 906 may be combined with sending the PRT neural network indicator in block 904. In some embodiments, the weights may be the weights for the receiving wireless communication device to use in implementing the selected receiver neural network for demodulating the transmission waveform to generate a reconstruction of the data tones. In some embodiments, the weights may be the receiver neural network indicator, and sending the weights for the receiver neural network in block 906 may be combined with sending the receiver neural network indicator in block 904. In some embodiments, the wireless communication device may send the PRT neural network to the other wireless communication device. In some embodiments, the receiver and/or the base station may send the PRT neural network weights in block 906. In some embodiments, the transmitter and/or the wireless device may send the receiver neural network weights in block 906.

In some embodiments, the method 900 may be implemented for each uplink established between a mobile wireless communication device and a base station wireless communication device. In some embodiments, the method 900 may be repeatedly implemented for each interval of a certain number of uplinks established between the wireless communication device and the base station wireless communication device. In some embodiments, the method 900 may be repeatedly implemented for uplinks established between the wireless communication device and the base station wireless communication device following a designated period of time.

Figure 10:
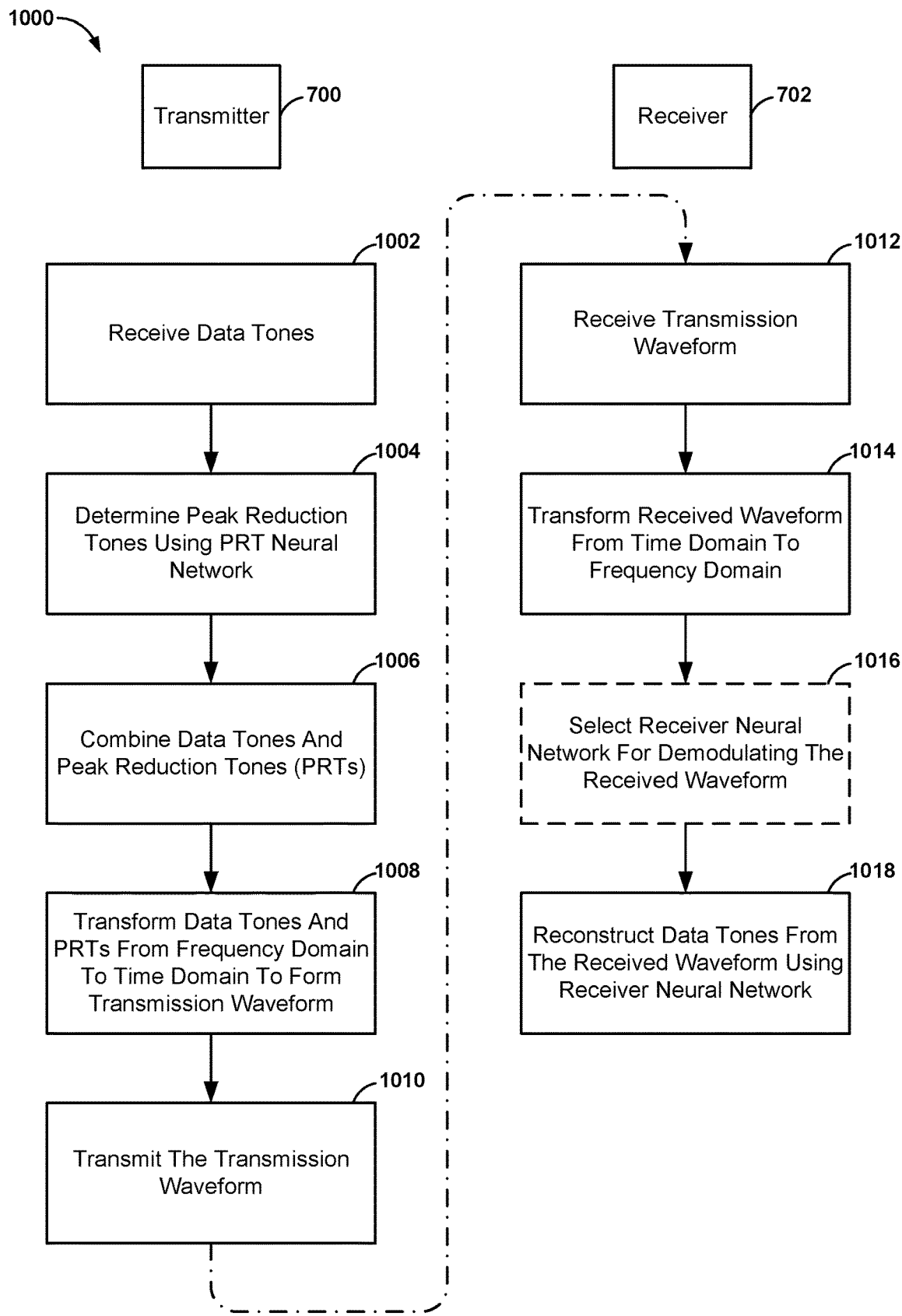
FIG. 10 is a process flow diagram illustrating an example of a method for implementing machine learning based encoding and decoding for receiver performance improvement using PRTs in accordance with various embodiments.

FIG. 10 illustrates an example of a method for implementing machine learning based encoding and decoding for receiver performance improvement using PRTs in accordance with various embodiments. With reference to FIGS. 1-10, the method 1000 may be implemented in a computing device (e.g., base station 110a-110d, 350, 402, wireless device 120a-120e, 200, 320, 404, transmitter 700, receiver 702), in general purpose hardware, in dedicated hardware, in software executing in a processor (e.g., processor 210, 212, 214, 216, 218, 252, 256, 260, 428, 432), or in a combination of a software-configured processor and dedicated hardware, such as a processor executing software within an peak reduction encoder and/or decoder system (e.g., processor 210, 212, 214, 216, 218, 252, 256, 260, 428, 432, encoder 500, decoder 600) that includes other individual components, and various memory/cache controllers. In order to encompass the alternative configurations enabled in various embodiments, the hardware implementing the method 1000 is referred to herein as a "wireless communication device."

In block 1002, a transmitter, a wireless device, an encoder and/or a PRT neural network (e.g., PRT neural network 502) of the wireless communication device may receive the data tones in block 1002. In some embodiments, the transmitter, the wireless device, the encoder and/or a signal combiner (e.g., signal combiner 504) may receive the data tones in block 1002. The data tones may be a stream of data, such as a data packet, that has been mapped to a sequence of modulation symbols, such as quadrature amplitude modulation (QAM) symbols (e.g. 16QAM symbols).

In block 1004, a trained PRT neural network (e.g., 502) within the wireless communication device may receive the data tones as an input and output a one or more PRTs configured to reduce the PAPR of the signal output by the Inverse Fast Fourier Transform circuit (e.g., 506). As described herein, the PRT neural network (e.g., 502) may be trained to generate PRTs based on the input data tones that compensates for peaks in the signal that will be output from the Inverse Fast Fourier Transform circuit. The PRTs may be allocated to subcarriers orthogonal to the subcarriers of the data tones such that the combination of the PRTs and the data tones reduces the amplitude of the peaks of the waveform that corresponds to the data tones.

In block 1006, a signal combiner (e.g., 504) in the wireless communication device may combine the data tones and the PRTs, output by the trained neural network, to output a combined signal that is directed to the Inverse Fast Fourier Transform circuit. The PRT may be combined with the data tones to reduce the PAPR of the data tones. The PRTs and the data signal may be combined through frequency division multiplexing of the PRTs and the data signal. The combined data signal and PRT may be referred to as a transmission waveform.

In block 1008, an inverse fast Fourier transform component (e.g., 506) in the wireless communication device may transform the processed data signal from the frequency domain to the time domain to generate a transmission waveform for amplification and transmission.

In block 1010, a transmitter of the wireless communication device may transmit the transmission waveform to another wireless communication device. In some embodiments, the wireless communication device may transmit the transmission waveform to wireless communication devices via a 5G NR network.

In block 1012, the antenna of a receiver wireless communication device may receive the transmission waveform from the transmitting wireless communication device.

In block 1014, a fast Fourier transform component (e.g., 602) of the receiver wireless communication device may transform the transmission waveform from the time domain to the frequency domain.

In optional block 1016, the receiving wireless communication device may select a receiver neural network for demodulating wireless signals received from the transmitter wireless communication device. The operations in block 1016 are optional, because in some embodiments, the receiver neural network may not change. Also, the operations in block 1016 may be performed prior to receiving the transmission waveform, such as during processes for establishing a wireless communication link with the transmitter. In some embodiments, the receiver wireless communication device may have already received and/or may receive, as part of the transmission of the transmitter wireless communication device, a receiver neural network indicator, as described herein in block 904 of the method 900 (FIG. 9). In some embodiments, the another wireless communication device may use the receiver neural network indicator as a value for a hash function, look up table, data structure location, etc. for selecting the receiver neural network. In some embodiments, the receiving wireless communication device may be communicative linked to multiple wireless communication devices, and may us metadata of the transmission waveform identifying the wireless communication device to associate the receiver neural network indicator from the wireless communication device with the transmission waveform. In some embodiments, the receiver, the base station, the decoder, and/or a receiver neural network may select a receiver neural network for demodulating the transmission waveform in block 1016.

In block 1018, the receiver wireless communication device may process the frequency domain signal output from the fast Fourier transform component in block 1014 through a trained receiver neural network to generate a reconstruction of the data tones. As described herein the receiver neural network in the receiver may be trained based on outputs from the transmitter that includes a PRT neural network (i.e., the PRT neural network used on block 1004) trained to reduce PAPR in the signal for transmission by the transmitting wireless communication device. The receiver neural network in the receiver wireless communication device may be configured to demodulate the frequency domain signal to reconstruct the data tones. By being trained based on outputs from the transmitter that includes the PRT neural network, the receiver neural network is able to use information inherent within the PRTs to recover the data tones more accurately than may be possible using conventional demodulating circuits.

Figure 11A:
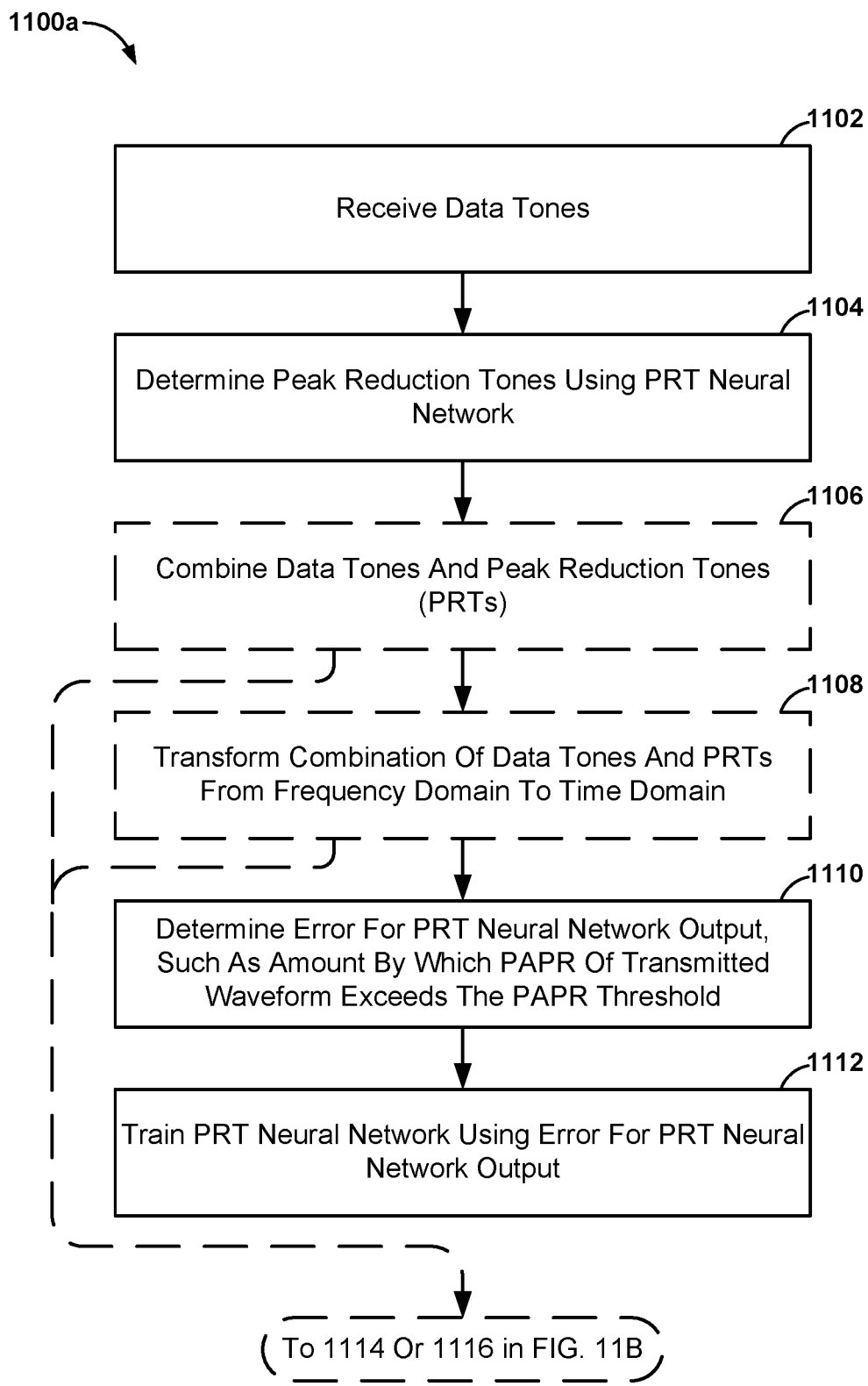
FIGS. 11A and 11B are process flow diagrams illustrating examples of methods for training neural networks for generating PRTs based on an input data signal and for extracting the PRTs on the transmitter side and reconstructing the data signal on the receiver in accordance with various embodiments.
Figure 11B:
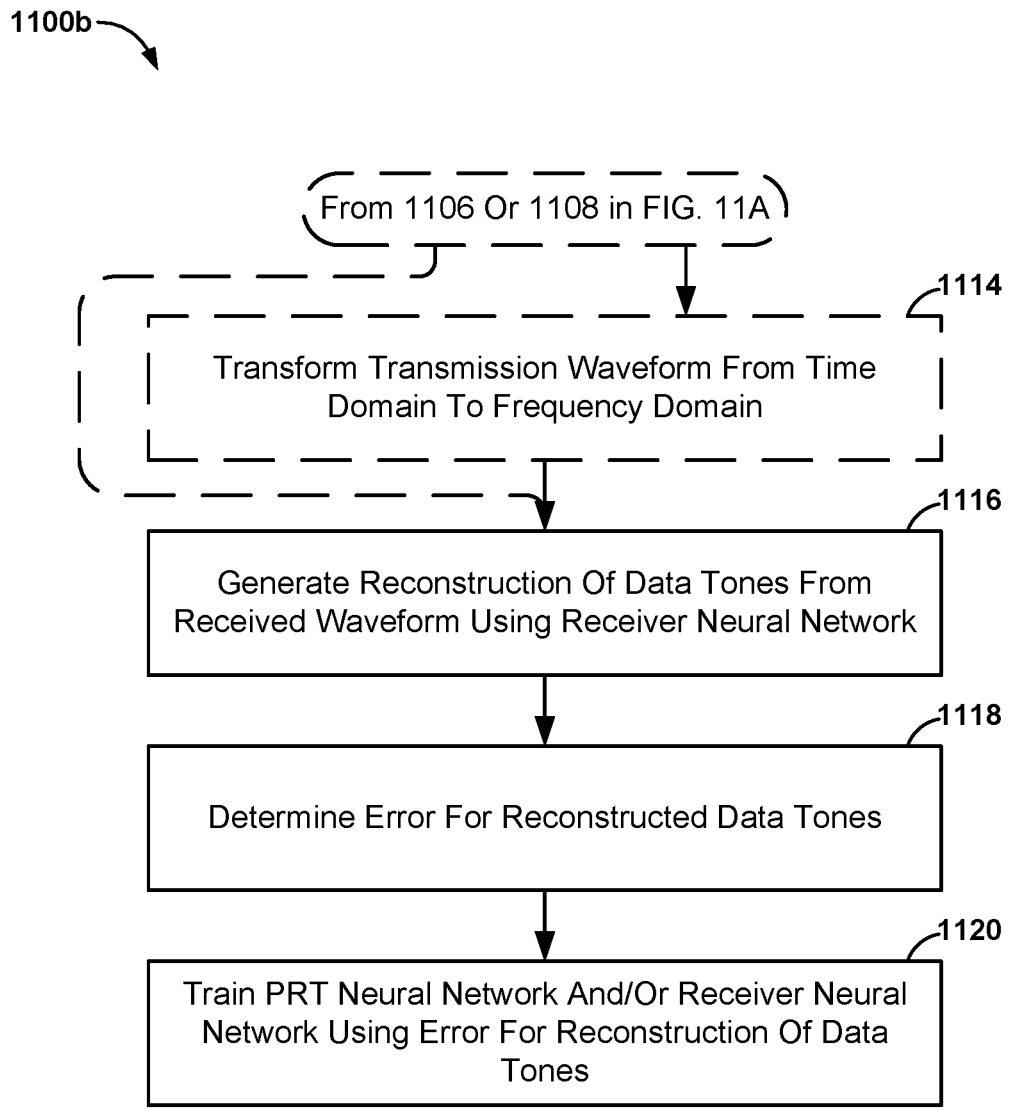

FIGS. 11A and 11B illustrate examples of methods 1100a, 1100b for training machine learning neural networks on the transmitter side for generating PRTs based on an input of data tones and for extracting the PRTs and reconstructing the data tones on the receiver side in accordance with various embodiments. With reference to FIGS. 1-11B, the methods 1100a, 1100b may be implemented in a wireless communication device (e.g., base station 110a-110d, 350, 402, wireless device 120a-120e, 200, 320, 404, transmitter 700, receiver 702) having a neural network (e.g., 502, 602) in or coupled to a processor (e.g., processor 210, 212, 214, 216, 218, 252, 256, 260, 428, 432), or in a combination of a software-configured processor and dedicated hardware, such as a processor executing software within an peak reduction encoder and/or decoder system (e.g., processor 210, 212, 214, 216, 218, 252, 256, 260, 428, 432, encoder 500, decoder 600) that includes other individual components, and various memory/cache controllers. In order to encompass the alternative configurations enabled in various embodiments, the hardware implementing the methods 1100a, 1100b is referred to herein as a "training device."

In block 1102, the training device may receive a data signal representative of a data signal a transmitter may send to a receiver during a wireless communication. In some embodiments, an encoder and/or a PRT neural network (e.g., PRT neural network 502) may receive the data tone in block 1102. In some embodiments, the encoder and/or a signal combiner (e.g., signal combiner 504) may receive the data tone in block 1102.

In block 1104, the training device may determine PRTs configured to reduce the PAPR of the transmission waveform that will be amplified for transmission. PRTs may be tones orthogonal to the data tone configured such that the combination of the PRTs and the data tone reduces the amplitude of the peaks of the waveform of the output signal that will be amplified for transmission. In some embodiments the multiple PRTs may be determined using conventional recursive algorithms. In some embodiments, the encoder and/or the PRT neural network may determine a PRT in block 1104.

In optional block 1106, the training device may combine the data tones and the generated PRTs to generate a combined signal. The PRTs and the data tones may be combined through frequency division multiplexing of the PRTs and the data tones. The combined data tones and PRTs may be referred to as a transmission waveform. In some embodiments, the encoder and/or the signal combiner may combine the data tones and the PRTs in block 1106. In some embodiments, the transmission waveform may be provided to the decoder and/or receiver neural network for block 1116 of the method 1100b in FIG. 11B.

In optional block 1108, the training device may transform the transmission waveform from the frequency domain to the time domain. In some embodiments, the encoder and/or an inverse fast Fourier transform component (e.g., inverse fast Fourier transform component 506) may transform the transmission waveform from the frequency domain to the time domain in block 1108.

In block 1110, the training device may determine an error for the PRT neural network output. In some embodiments, the error for the PRT neural network output may be determined by the training device may comparing the PAPR of the transmission waveform to a PAPR threshold (e.g., maximum permissible peak to average power for the transmitter device) and provide the amount in excess of the PAPR threshold as a correction error to the PRT neural network. In some embodiments, the PAPR threshold may be a general PAPR threshold value for any number of data signals. In some embodiments, the PAPR threshold may be a PAPR threshold value for a specific data signal. In some embodiments, the PAPR threshold may be a value representing a threshold for a difference in a PAPR value of a data signal and the PAPR of the transmission waveform. The PAPR threshold may represent a PAPR value that is acceptable for amplification and transmission of a transmission waveform.

In block 1112, the training device may train the PRT neural network using the error for the PRT neural network output. The training device may be configured to update weight values of the PRT neural network used to determine the PRTs in order to reduce the error or errors determined in block 1110. The training device may use an algorithm configured to use the error value and weights as inputs and output updated weights. In some embodiments, the encoder and/or a processor may train the PRT neural network using the error for the PRT neural network output in block 1112.

Once the transmitter PRT neural network has been trained such that the transmission waveform falls within the PAPR threshold, the receiver neural network may be trained. Referring to FIG. 11B, in optional block 1114 the training device may transform the transmission waveform output by the transmitter from the time domain to the frequency domain. In some embodiments, a decoder and/or a fast Fourier transform component (e.g., fast Fourier transform component 602) may transform the transmission waveform from the time domain to the frequency domain in block 1110. In some embodiments, the training device may receive the transmission waveform output by the training device in block 1108 of the method 1100a in FIG. 11A.

In block 1116, the training device may apply the frequency domain transmission waveform to the receiver neural network to generate a reconstruction of the data tone that was the input on the transmitter (i.e., in block 1102). The receiver neural network demodulates the transmission waveform to reconstruct the data tones with the help of the received PRTs inserted by the transmitter.

In block 1118, the training device may determine an error for the reconstruction of the data tones. The training device may be configured to compare the data tones and the reconstruction of the data tones by various known means to determine an error value for the reconstruction of the data tones. For example, the reconstruction of the data tones and the data tone qualities and/or contents may be compared. As a further example, a result of processing the reconstruction of the data tones may indicate an error value for the reconstruction of the data, and/or a comparison of the result to an expected result may indicate an error value for the reconstruction of the data tones. In some embodiments, the encoder, the decoder, and/or a processor may determine an error for the reconstruction of the data tones in block 1118.

In block 1120, the training device may train the receiver neural network using the error for the reconstruction of the data tones. The training device may be configured to update weight values of the PRT neural network used to generate the PRT and/or weight values of the receiver neural network used to demodulate the transmission waveform to reconstruct the data tones so as to reduce the error. The training device may use an algorithm configured to use the error value and weights as inputs and output updated weights. In some embodiments, the encoder, the decoder, and/or a processor may train the receiver neural network using the error for the reconstruction of the data signal in block 1120.

In some embodiments, the methods 1100a, 1100b may be repeated together training both the PRT neural network and receiver neural network in combination until a difference between the data tones input to the transmitter with its PRT neural network and the reconstructed data tones output by the receiver neural network falls within an acceptable error threshold. In some embodiments, the methods 1100a, 1100b may be repeated using multiple different data signals for multiple iterations of the methods 1100a, 1100b. The methods 1100a, 1100b may be repeated using the multiple data signals until a number of the multiple data signals, up to all of the multiple data signals, result in error values that do not exceed the threshold of error. Successive iterations of the methods 1100a, 1100b may use updated weights resulting from training the PRT neural network and/or the receiver neural network using the error values in block 1112, 1120.

Various embodiments improve the functioning of wireless communication device transmitters and receivers compared to conventional transmitter/receiver pairs. By training the receiver neural network based on the output of the transmitter that uses a trained PRT neural network to generate PRTs, the trained receiver neural network is able to make use of information related to the PRTs that is embedded within the transmission waveform output by the transmitter to reconstruct the data tones more accurately (i.e., with less error) than possible using conventional demodulation circuits that ignore the PRTs. By training the PRT neural network and receiver neural network in combination, a close connection between encoder and decoder may be coupled via the PRTs inserted into the transmitted signals, thereby both reducing the PAPR to within acceptable levels on the transmitter side while also enabling better reconstruction of the data tones on the receiver side than feasible using conventional PRT generation circuits and demodulation circuits.

Figure 12:
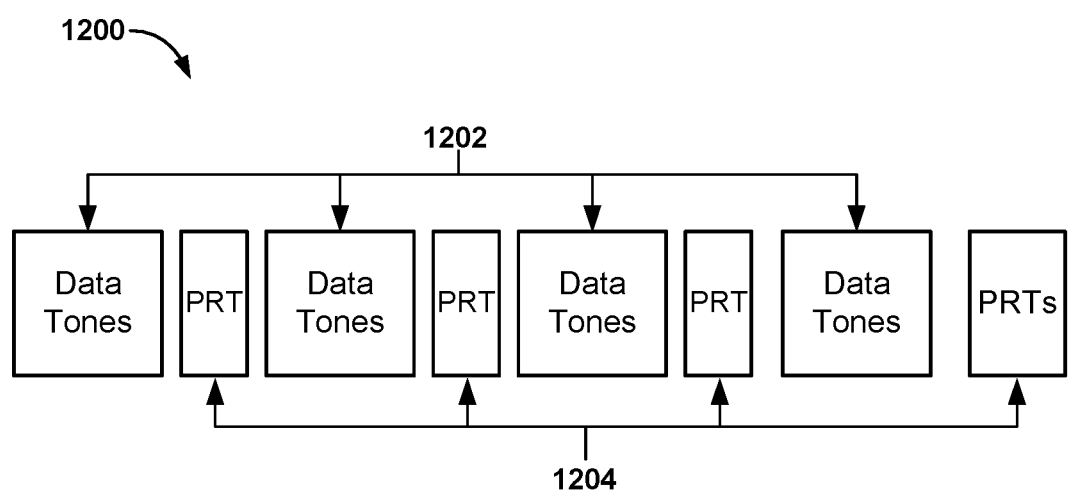
FIG. 12 is a carrier signal block diagram illustrating an example of a transmission waveform having data tones and PRTs on orthogonal subcarriers in accordance with various embodiments.

FIG. 12 illustrates and an example of a transmission waveform 1200 having data tones and PRTs on orthogonal subcarriers 1202, 1204 in accordance with various embodiments. With reference to FIGS. 1-12, an encoder (e.g., encoder 500) on a transmitter (e.g., transmitter 700) may generate a transmission waveform 1200 from data tones and PRTs generated from the data tones by a PRT neural network (e.g., PRT neural network 502). The data tones on data tone subcarriers 1202 and PRTs on orthogonal subcarriers 1204 may be combined by a signal combiner (e.g., 504) of the transmitter (e.g., 700) through frequency division multiplexing. The data tones and PRTs may be transmitted by the transmitter on orthogonal subcarriers 1202, 1204. The PRTs may be be transmitted on subcarriers 1204 orthogonal to subcarriers 1202 reserved for the data tones.

Figure 13:
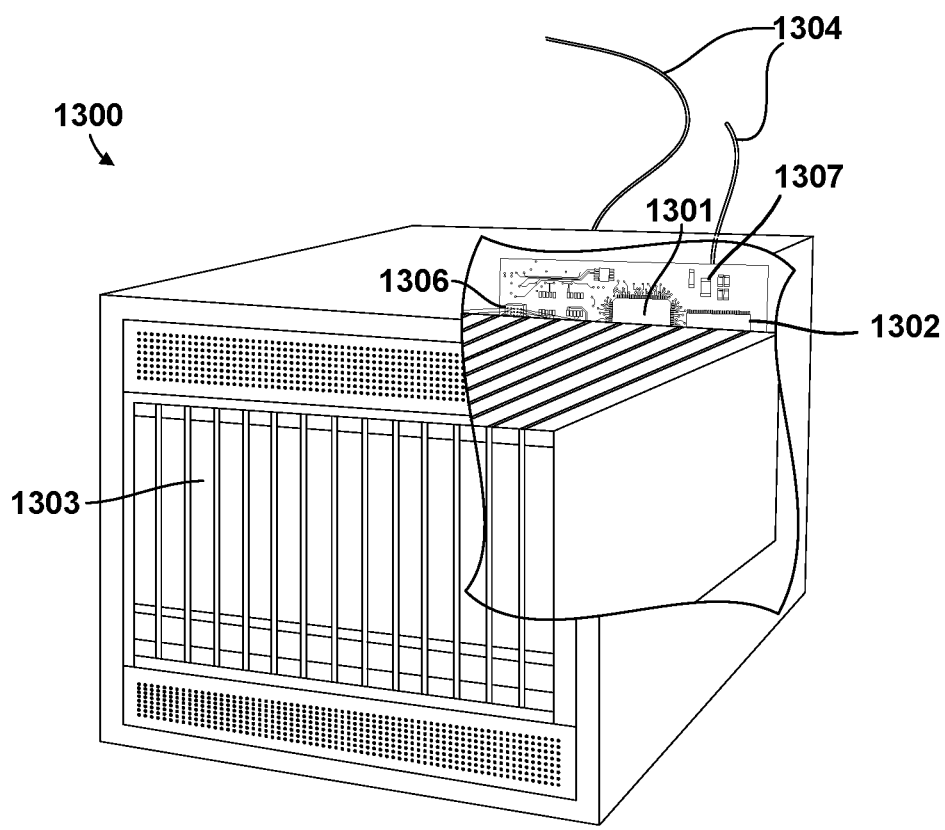
FIG. 13 is a component block diagram illustrating an example network computing device.

Various embodiments, including methods 900, 1000, and 1100, may be performed in a variety of network computing devices (e.g., in a base station 110a-110d, 350, 402), an example of which is illustrated in FIG. 13, which illustrates an example of a network computing device 1300. With reference to FIGS. 1-12, the network computing device 1300 may function as a network element of a communication network, such as a base station. The network computing device 1300 may include a processor 1301 coupled to volatile memory 1302 and a large capacity nonvolatile memory, such as a disk drive 1303. The network computing device 1300 also may include a peripheral memory access device such as a floppy disc drive, compact disc (CD) or digital video disc (DVD) drive 1306 coupled to the processor 1301. The network computing device 1300 also may include network access ports 1304 (or interfaces) coupled to the processor 1301 for establishing data connections with a network, such as the Internet or a local area network coupled to other system computers and servers. The network computing device 1300 may include one or more antennas 1307 for sending and receiving electromagnetic radiation that may be connected to a wireless communication link. The network computing device 1300 may include additional access ports, such as USB, Firewire, Thunderbolt, and the like for coupling to peripherals, external memory, or other devices.

Figure 14:
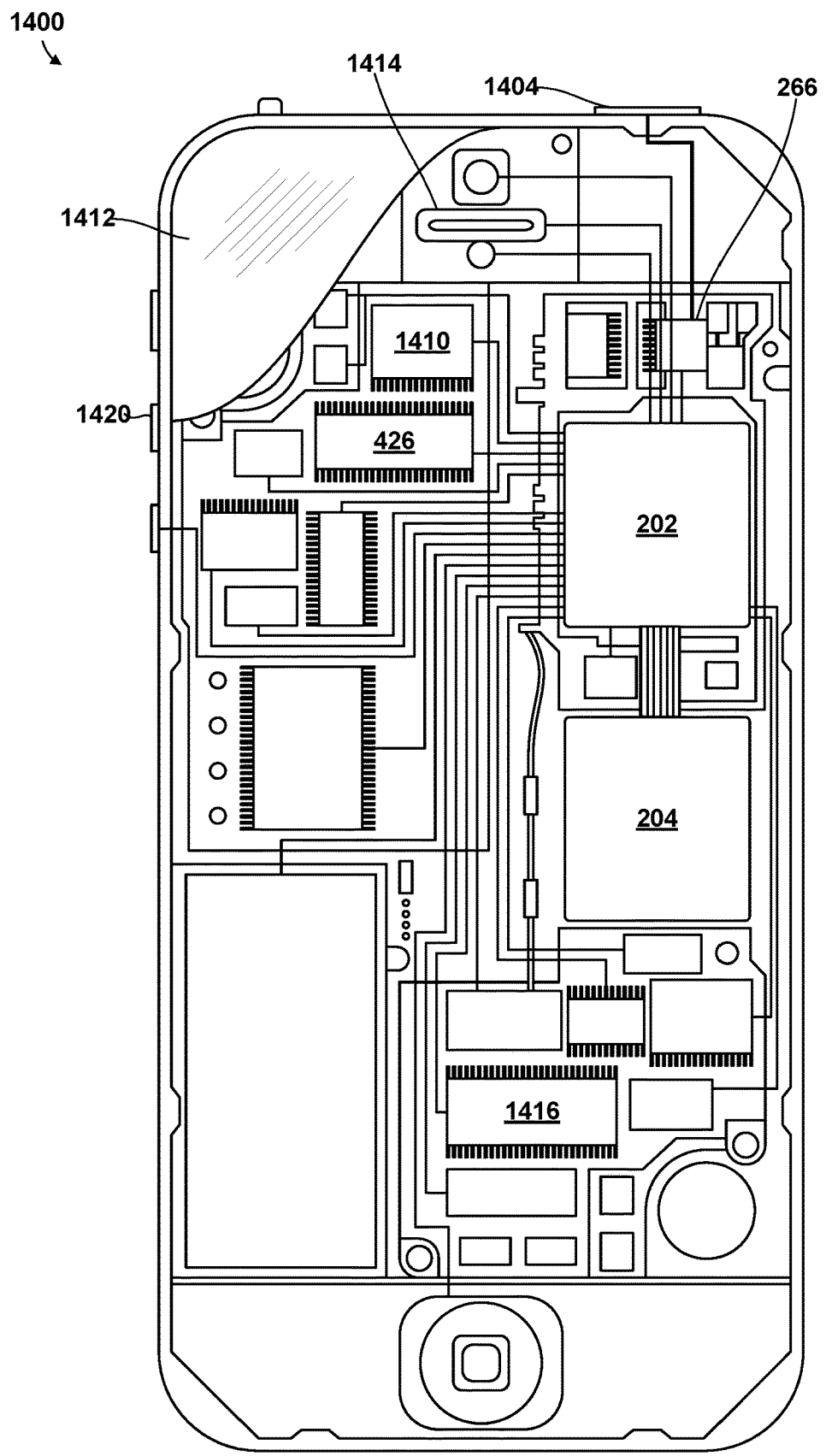
FIG. 14 is a component block diagram illustrating an example wireless device.

Various embodiments, including methods 900, 1000, and 1100, may be performed in a variety of wireless devices (e.g., the wireless device 120a-120e, 200, 320, 404), an example of which is illustrated in FIG. 14, which illustrates and example of a wireless device 1400 suitable for use with various embodiments. With reference to FIGS. 1-12, a wireless device 1400 may include a first SOC 202 (e.g., a SOC-CPU) coupled to a second SOC 204 (e.g., a 5G capable SOC). The first and second SOCs 202, 204 may be coupled to internal memory 426, 1416, a display 1412, and to a speaker 1414. Additionally, the wireless device 1400 may include an antenna 1404 for sending and receiving electromagnetic radiation that may be connected to a wireless data link and/or cellular telephone transceiver 266 coupled to one or more processors in the first and/or second SOCs 202, 204. The wireless device 1400 may also include menu selection buttons or rocker switches 1420 for receiving user inputs.

The wireless device 1400 also may include a sound encoding/decoding (CODEC) circuit 1410, which digitizes sound received from a microphone into data packets suitable for wireless transmission and decodes received sound data packets to generate analog signals that are provided to the speaker to generate sound. Also, one or more of the processors in the first and second SOCs 202, 204, wireless transceiver 266 and CODEC 1410 may include a digital signal processor (DSP) circuit (not shown separately).

The processors of the network computing device 1300 and the wireless device 1400 may be any programmable microprocessor, microcomputer or multiple processor chip or chips that can be configured by software instructions (applications) to perform a variety of functions, including the functions of the various embodiments described below. In some mobile devices, multiple processors may be provided, such as one processor within an SOC 204 dedicated to wireless communication functions and one processor within an SOC 202 dedicated to running other applications. Software applications may be stored in the memory 426, 430, 1416 before they are accessed and loaded into the processor. The processors may include internal memory sufficient to store the application software instructions.

As used in this application, the terms "component," "module," "system," and the like are intended to include a computer-related entity, such as, but not limited to, hardware, firmware, a combination of hardware and software, software, or software in execution, which are configured to perform particular operations or functions. For example, a component may be, but is not limited to, a process running on a processor, a processor, an object, an executable, a thread of execution, a program, or a computer. By way of illustration, both an application running on a wireless device and the wireless device may be referred to as a component. One or more components may reside within a process or thread of execution and a component may be localized on one processor or core or distributed between two or more processors or cores. In addition, these components may execute from various non-transitory computer readable media having various instructions or data structures stored thereon. Components may communicate by way of local or remote processes, function or procedure calls, electronic signals, data packets, memory read/writes, and other known network, computer, processor, or process related communication methodologies.

A number of different cellular and mobile communication services and standards are available or contemplated in the future, all of which may implement and benefit from the various embodiments. Such services and standards include, such as third generation partnership project (3GPP), long term evolution (LTE) systems, third generation wireless mobile communication technology (3G), fourth generation wireless mobile communication technology (4G), fifth generation wireless mobile communication technology (5G), global system for mobile communications (GSM), universal mobile telecommunications system (UMTS), 3GSM, general packet radio service (GPRS), code division multiple access (CDMA) systems (such as cdmaOne, CDMA1020™), enhanced data rates for GSM evolution (EDGE), advanced mobile phone system (AMPS), digital AMPS (IS-136/TDMA), evolution-data optimized (EV-DO), digital enhanced cordless telecommunications (DECT), Worldwide Interoperability for Microwave Access (WiMAX), wireless local area network (WLAN), Wi-Fi Protected Access I & II (WPA, WPA2), and integrated digital enhanced network (iDEN). Each of these technologies involves, for example, the transmission and reception of voice, data, signaling, or content messages. It should be understood that any references to terminology or technical details related to an individual telecommunication standard or technology are for illustrative purposes only, and are not intended to limit the scope of the claims to a particular communication system or technology unless specifically recited in the claim language.

Various embodiments illustrated and described are provided merely as examples to illustrate various features of the claims. However, features shown and described with respect to any given implementation are not necessarily limited to the associated implementation and may be used or combined with other embodiments that are shown and described. Further, the claims are not intended to be limited by any one example implementation. For example, one or more of the operations of the methods disclosed herein may be substituted for or combined with one or more operations of the methods disclosed herein.

As used herein, a phrase referring to "at least one of" a list of items refers to any combination of those items, including single members. As an example, "at least one of: a, b, or c" is intended to cover: a, b, c, a-b, a-c, b-c, and a-b-c.

Various illustrative logics, logical blocks, modules, components, circuits, and algorithm operations described in connection with the embodiments disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented as hardware or software depends upon the particular application and design constraints imposed on the overall system.

The hardware and data processing apparatus used to implement the various illustrative logics, logical blocks, modules, and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, or any conventional processor, controller, microcontroller, or state machine. A processor also may be implemented as a combination, such as a combination of a DSP and a microprocessor, a plurality of microprocessors, one or more microprocessors in conjunction with a DSP core, or any other such configuration. In some embodiments, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Embodiments of the subject matter described in this specification also can be implemented as one or more computer programs, i.e., one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the embodiments described in this disclosure may be readily apparent to those skilled in the art, and the generic principles defined herein may be applied to other embodiments without departing from the spirit or scope of this disclosure. Thus, the claims are not intended to be limited to the embodiments shown herein, but are to be accorded the widest scope consistent with this disclosure, the principles and the novel features disclosed herein.

Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of any device as implemented.

Certain features that are described in this specification in the context of separate embodiments also can be implemented in combination in a single implementation. Conversely, various features that are described in the context of a single implementation also can be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict more example processes in the form of a flow diagram. However, other operations that are not depicted can be incorporated in the example processes that are schematically illustrated. For example, one or more additional operations can be performed before, after, simultaneously, or between any of the illustrated operations. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products. Additionally, other embodiments are within the scope of the following claims. In some cases, the actions recited in the claims can be performed in a different order and still achieve desirable results.

What is claimed is:

1. A method performed in receiver circuitry of a wireless communication device for demodulating wireless transmission waveforms to reconstruct data tones, comprising:
    receiving, from a transmitter, wireless transmission waveforms that include peak reduction tones (PRTs) that were generated by a PRT neural network in the transmitter; and
    demodulating the received wireless transmission waveforms using a receiver neural network that has been trained based on outputs of the transmitter to output a reconstruction of the data tones.

2. The method of claim 1, further comprising selecting from among a plurality of trained receiver neural networks stored in the wireless communication device a receiver neural network that has been trained on the PRT neural network being used by the transmitter of the received transmission waveforms.

3. The method of claim 2, further comprising receiving weights for the receiver neural network from the transmitter, wherein demodulating the received transmission waveforms using the receiver neural network that has been trained based on outputs of the transmitter comprises demodulating the received transmission waveforms using the selected receiver neural network and the weights for the receiver neural network received from the transmitter.

4. The method of claim 2, further comprising receiving, from the transmitter of the received transmission waveforms, an indicator of the receiver neural network that has been trained on the PRT neural network being used by the transmitter of the received transmission waveforms, wherein selecting a receiver neural network from among a plurality of trained receiver neural networks stored in the wireless communication device comprises selecting the receiver neural network based on the indicator received from the transmitter.

5. The method of claim 4, further comprising receiving weights for the receiver neural network from the transmitter, wherein demodulating the received transmission waveforms using the receiver neural network that has been trained based on outputs of the transmitter comprises demodulating the received transmission waveforms using the selected receiver neural network and the weights for the receiver neural network received from the transmitter.

6. The method of claim 1, further comprising sending to the transmitter an indicator of a PRT neural network to be used by the transmitter to insert PRTs into transmission waveforms, wherein the PRT neural network associated with the indicator was used to train the receiver neural network used to demodulate transmission waveforms received from the transmitter.

7. The method of claim 6, further comprising transmitting weights for the PRT neural network to the transmitter.

8. A receiver wireless communication device, comprising:
a processing device configured with processor-executable instructions to perform operations comprising:
receiving, from a transmitter, wireless transmission waveforms that include peak reduction tones (PRTs) that were generated by a PRT neural network in the transmitter; and
demodulating the received wireless transmission waveforms using a receiver neural network that has been trained based on outputs of the transmitter to output a reconstruction of data tones.

9. The receiver wireless communication device of claim 8, wherein the processing device is configured with processor-executable instructions to perform operations further comprising selecting from among a plurality of trained receiver neural networks stored in the receiver wireless communication device a receiver neural network that has been trained on the PRT neural network being used by the transmitter of the received transmission waveforms.

10. The receiver wireless communication device of claim 9, wherein the processing device is configured with processor-executable instructions to perform operations further comprising receiving weights for the receiver neural network from the transmitter, wherein demodulating the received transmission waveforms using the receiver neural network that has been trained based on outputs of the transmitter comprises demodulating the received transmission waveforms using the selected receiver neural network and the weights for the receiver neural network received from the transmitter.

11. The receiver wireless communication device of claim 9, wherein the processing device is configured with processor-executable instructions to perform operations further comprising receiving, from the transmitter of the received transmission waveforms, an indicator of the receiver neural network that has been trained on the PRT neural network being used by the transmitter of the received transmission waveforms, wherein selecting a receiver neural network from among a plurality of trained receiver neural networks stored in the receiver wireless communication device comprises selecting the receiver neural network based on the indicator received from the transmitter.

12. The receiver wireless communication device of claim 11, wherein the processing device is configured with processor-executable instructions to perform operations further comprising receiving weights for the receiver neural network from the transmitter, wherein demodulating the received transmission waveforms using the receiver neural network that has been trained based on outputs of the transmitter comprises demodulating the received transmission waveforms using the selected receiver neural network and the weights for the receiver neural network received from the transmitter.

13. The receiver wireless communication device of claim 8, wherein the processing device is configured with processor-executable instructions to perform operations further comprising sending to the transmitter an indicator of a PRT neural network to be used by the transmitter to insert PRTs into transmission waveforms, wherein the PRT neural network associated with the indicator was used to train the receiver neural network used to demodulate transmission waveforms received from the transmitter.

14. The receiver wireless communication device of claim 13, wherein the processing device is configured with processor-executable instructions to perform operations further comprising transmitting weights for the PRT neural network to the transmitter.

15. A method performed in transmitter circuitry of a wireless communication device for transmitting data tones via wireless transmission waveforms to a receiver, comprising:
processing the data tones through a peak reduction tone (PRT) neural network trained to generate PRTs that when combined with the data tones will result in a transmission waveform that will exhibit a peak-to-average power ratio (PAPR) within a PAPR limit threshold; and
combining the data tones with PRTs output by the PRT neural network to output a transmission waveform for transmission to a receiving wireless communication device configured with a receiver neural network that has been trained based on outputs of the transmitter circuitry to demodulate wireless transmission waveforms from the transmitter circuitry.

16. The method of claim 15, further comprising:
transmitting a neural network indicator configured to indicate a receiver neural network for use by the receiving wireless communication device in demodulating the transmitted wireless transmission waveforms, wherein the indicated receiver neural network was trained based on outputs of the transmitter circuitry.

17. The method of claim 16, further comprising transmitting weights for the indicated receiver neural network to the receiving wireless device.

18. The method of claim 15, further comprising:
selecting from among a plurality of PRT neural networks stored on the wireless communication device a PRT neural network to use in processing the data tones to generate PRTs that was used to train the receiver neural network used in the receiving wireless communication device.

19. The method of claim 18, further comprising receiving from the receiving wireless communication device weights for the receiving wireless communication device.

20. The method of claim 18, further comprising receiving an indicator of the PRT neural network to use from the receiving wireless communication device, wherein selecting from among a plurality of PRT neural networks stored on the wireless communication device a PRT neural network to use in processing the data tones to generate PRTs comprises selecting the PRT neural network corresponding to the received indicator.

21. The method of claim 20, further comprising receiving from the receiving wireless communication device weights for the receiving wireless communication device.

22. A transmitter wireless communication device, comprising:
   a processing device configured with processor-executable instructions to perform operations comprising:
      processing data tones through a peak reduction tone (PRT) neural network trained to generate PRTs that when combined with the data tones will result in a transmission waveform that will exhibit a peak-to-average power ratio (PAPR) within a PAPR limit threshold; and
      combining the data tones with PRTs output by the PRT neural network to output a transmission waveform for transmission to a receiving wireless communication device configured with a receiver neural network that has been trained based on outputs of transmitter circuitry to demodulate wireless transmission waveforms from the transmitter circuitry.

23. The transmitter wireless communication device of claim 22, wherein the processing device is configured with processor-executable instructions to perform operations further comprising transmitting a neural network indicator configured to indicate a receiver neural network for use by the receiving wireless communication device in demodulating the transmitted wireless transmission waveforms, wherein the indicated receiver neural network was trained based on outputs of the transmitter circuitry.

24. The transmitter wireless communication device of claim 23, wherein the processing device is configured with processor-executable instructions to perform operations further comprising transmitting weights for the indicated receiver neural network to the receiving wireless device.

25. The transmitter wireless communication device of claim 22, wherein the processing device is configured with processor-executable instructions to perform operations further comprising selecting from among a plurality of PRT neural networks stored on the transmitter wireless communication device a PRT neural network to use in processing the data tones to generate PRTs that was used to train the receiver neural network used in the receiving wireless communication device.

26. The transmitter wireless communication device of claim 25, wherein the processing device is configured with processor-executable instructions to perform operations further comprising receiving from the receiving wireless communication device weights for the receiving wireless communication device.

27. The transmitter wireless communication device of claim 25, wherein the processing device is configured with processor-executable instructions to perform operations further comprising receiving an indicator of the PRT neural network to use from the receiving wireless communication device, wherein selecting from among a plurality of PRT neural networks stored on the transmitter wireless communication device a PRT neural network to use in processing the data tones to generate PRTs comprises selecting the PRT neural network corresponding to the received indicator.

28. The transmitter wireless communication device of claim 27, wherein the processing device is configured with processor-executable instructions to perform operations further comprising receiving from the receiving wireless communication device weights for the receiving wireless communication device.

* * * * *